United States Patent
Fripp et al.

(10) Patent No.: US 12,378,850 B2
(45) Date of Patent: Aug. 5, 2025

(54) FLUID FLOW CONTROL SYSTEM EMPLOYING GRAVITY DRIVEN FLOATS AND A VALVE

(71) Applicant: Halliburton Energy Services, Inc., Houston, TX (US)

(72) Inventors: Michael Linley Fripp, Carrollton, TX (US); Stephen Michael Greci, Carrollton, TX (US); Ibrahim El Mallawany, Dhahran (SA)

(73) Assignee: Halliburton Energy Services, Inc., Houston, TX (US)

( * ) Notice: Subject to any disclaimer, the term of this patent is extended or adjusted under 35 U.S.C. 154(b) by 210 days.

(21) Appl. No.: 17/237,257

(22) Filed: Apr. 22, 2021

(65) Prior Publication Data
US 2022/0341290 A1    Oct. 27, 2022

(51) Int. Cl.
*E21B 43/12*    (2006.01)
*E21B 34/08*    (2006.01)

(52) U.S. Cl.
CPC .............. *E21B 43/12* (2013.01); *E21B 34/08* (2013.01); *E21B 2200/02* (2020.05)

(58) Field of Classification Search
CPC .... E21B 34/142; E21B 43/12; E21B 2200/04; E21B 2200/02
See application file for complete search history.

(56) References Cited

U.S. PATENT DOCUMENTS

| | | | | |
|---|---|---|---|---|
| 4,392,507 A | * | 7/1983 | Harris | F02M 37/0023 137/512.5 |
| 5,893,415 A | * | 4/1999 | Ricks | E21B 34/08 166/372 |
| 7,913,765 B2 | | 3/2011 | Crow et al. | |
| 9,840,889 B2 | | 12/2017 | Killie et al. | |
| 2013/0068467 A1 | * | 3/2013 | Zhou | E21B 43/12 166/369 |
| 2014/0041731 A1 | | 2/2014 | Fripp et al. | |
| 2015/0308226 A1 | * | 10/2015 | Killie | E21B 43/12 166/373 |
| 2018/0283134 A1 | * | 10/2018 | Ornelaz | E21B 43/14 |
| 2019/0063182 A1 | | 2/2019 | Fripp et al. | |
| 2019/0264535 A1 | | 8/2019 | Killie et al. | |

FOREIGN PATENT DOCUMENTS

WO    2020117230 A1    6/2020

* cited by examiner

*Primary Examiner* — Robert E Fuller
(74) *Attorney, Agent, or Firm* — Scott Richardson; Parker Justiss, P.C.

(57) ABSTRACT

Provided is a fluid flow control system and a well system. The fluid flow control system, in one aspect, includes a valve having a fluid inlet operable to receive fluid, a control inlet operable to receive a control fluid, and a fluid outlet operable to pass the fluid to the tubing, the valve configured to open or close the fluid outlet based upon the control fluid. The fluid flow control system according to this aspect further includes a density control valve having an inlet conduit operable to receive the fluid and an outlet conduit coupled to the control inlet of the valve, the density control valve operable to send the control fluid to the valve to open or close the fluid outlet based upon a density of the fluid.

24 Claims, 23 Drawing Sheets

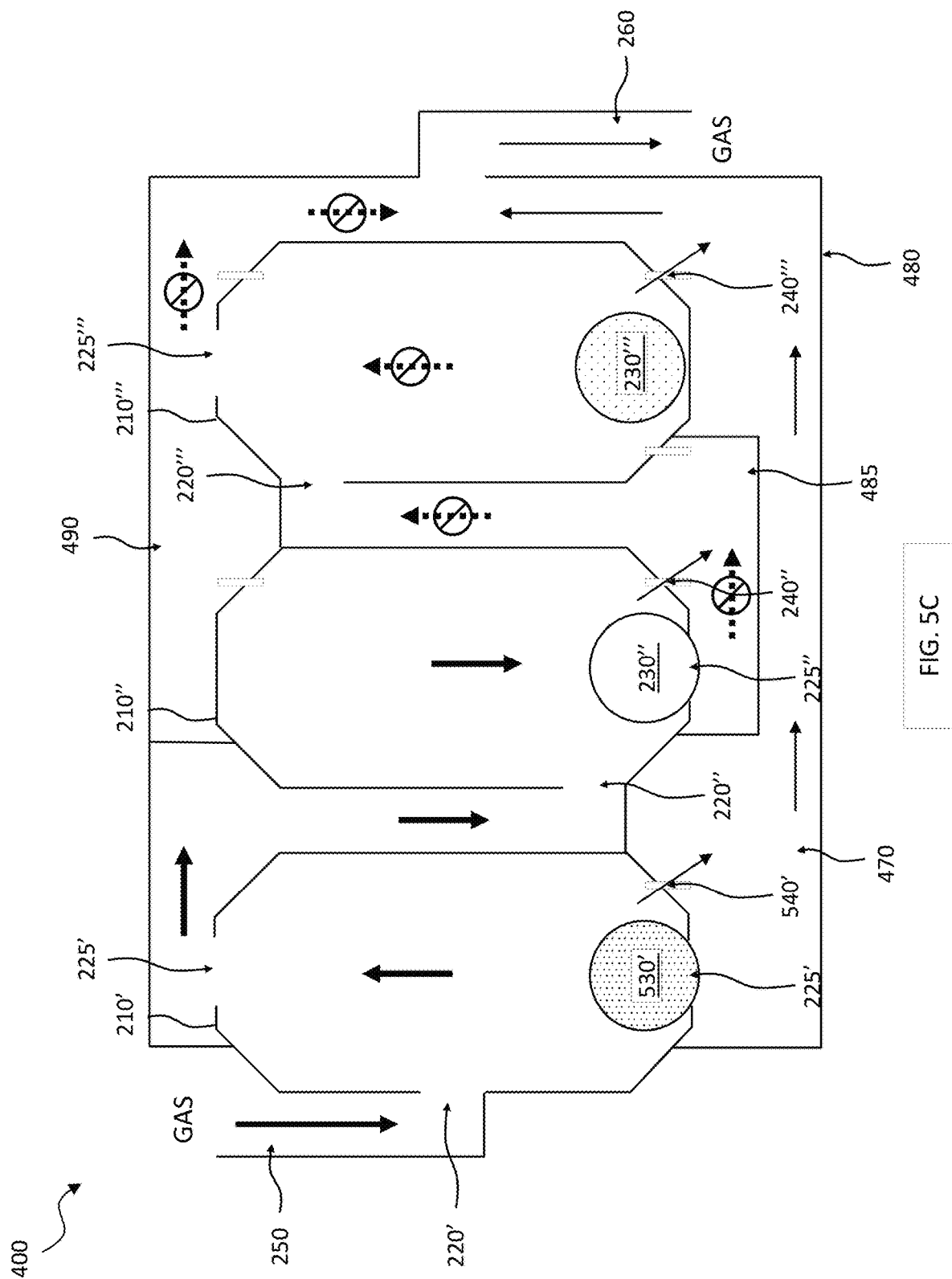

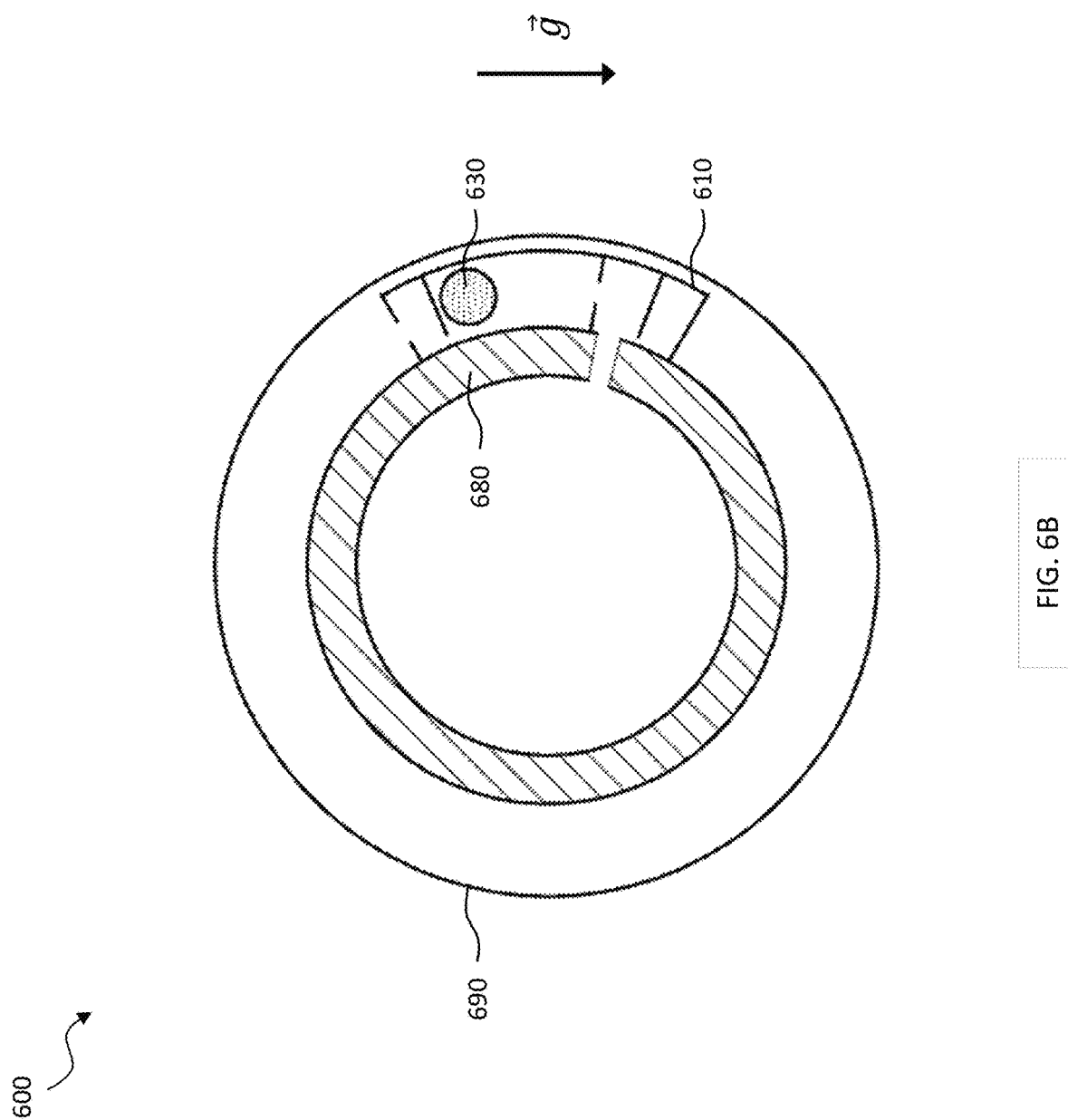

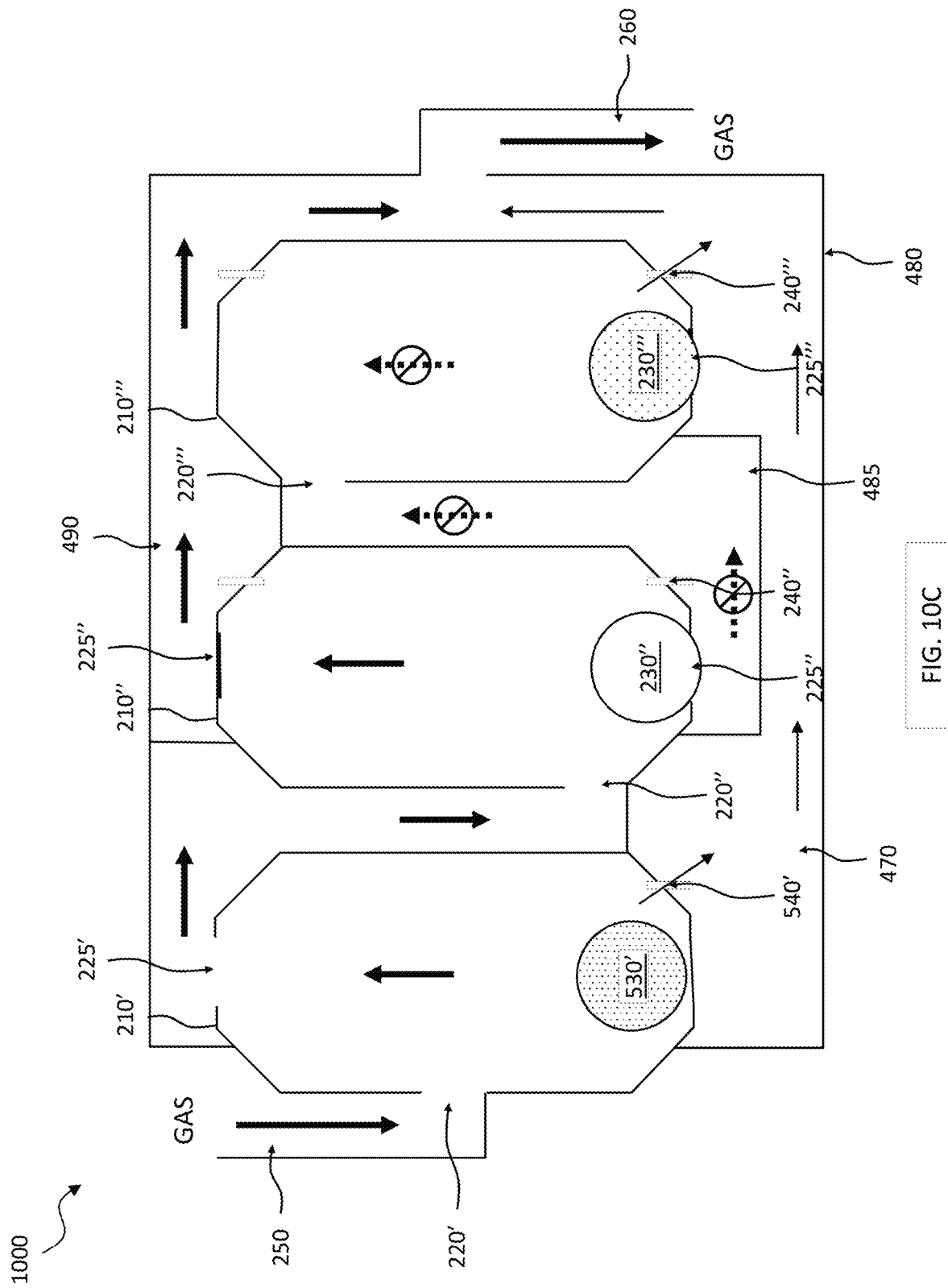

FLUID FLOW CONTROL SYSTEM EMPLOYING GRAVITY DRIVEN FLOATS AND A VALVE

BACKGROUND

In hydrocarbon production wells, it may be beneficial to regulate the flow of formation fluids from a subterranean formation into a wellbore penetrating the same. A variety of reasons or purposes may necessitate such regulation including, for example, prevention of water and/or gas coning, minimizing water and/or gas production, minimizing sand production, maximizing oil production, balancing production from various subterranean zones, and equalizing pressure among various subterranean zones, among others.

A number of devices and valves are available for regulating the flow of formation fluids. Some of these devices may be non-discriminating for different types of formation fluids and may simply function as a "gatekeeper" for regulating access to the interior of a wellbore pipe, such as a production string. Such gatekeeper devices may be simple on/off valves or they may be metered to regulate fluid flow over a continuum of flow rates. Other types of devices for regulating the flow of formation fluids may achieve at least some degree of discrimination between different types of formation fluids. Such devices may include, for example, tubular flow restrictors, nozzle-type flow restrictors, autonomous inflow control devices, non-autonomous inflow control devices, ports, tortuous paths, and combinations thereof.

BRIEF DESCRIPTION

Reference is now made to the following descriptions taken in conjunction with the accompanying drawings, in which:

FIGS. 5A through 5D illustrate the density control valve of FIG. 4 at different stages of the well life of an oil producing well;

FIG. 6B illustrates a typical placement of the housing and density dependent float of the density control valve in a cross section of the completion string;

FIGS. 10A through 10D illustrate an alternative embodiment of a density control valve at different stages of the well life of an oil producing well;

DETAILED DESCRIPTION

Figure 1:
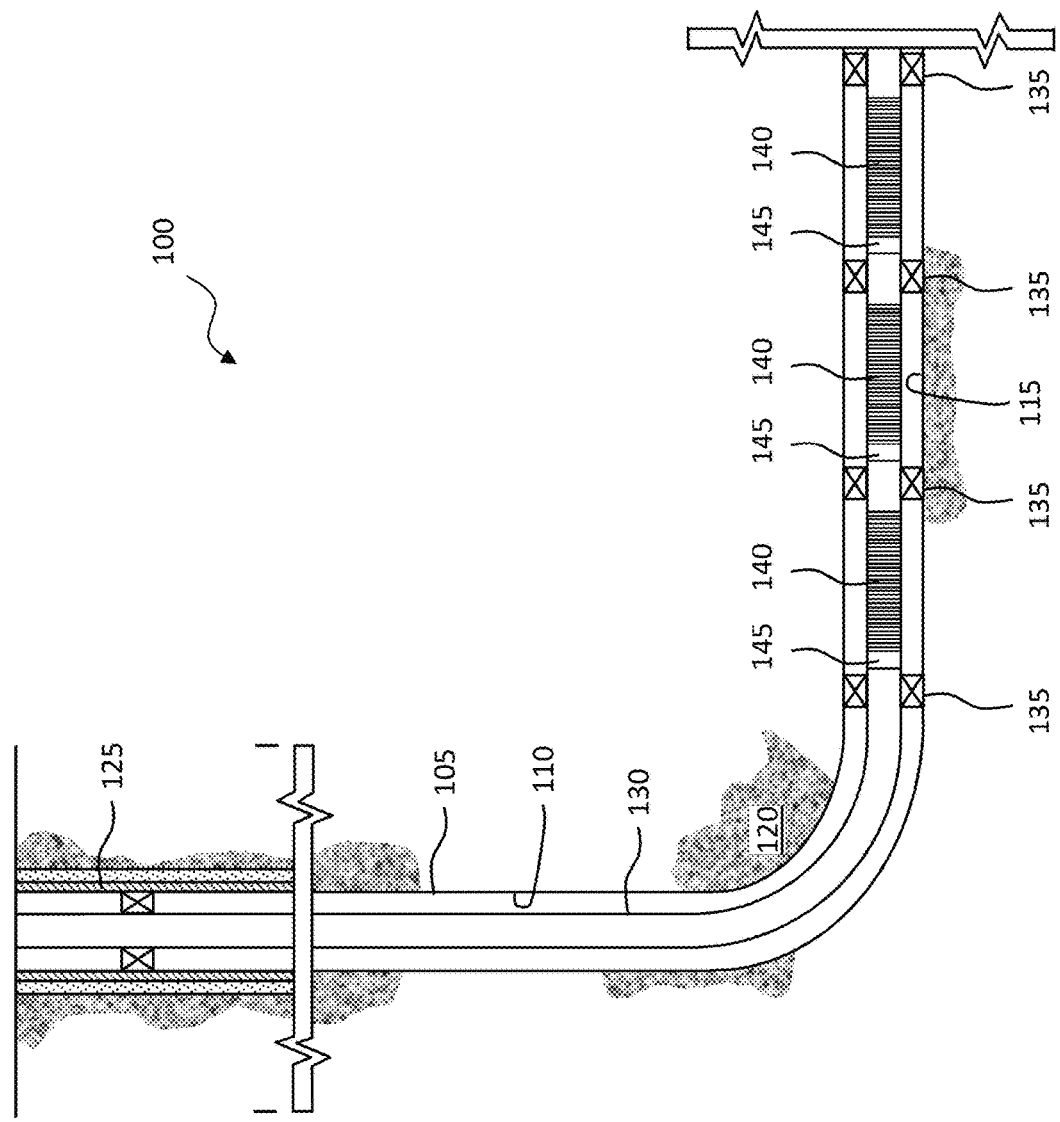
FIG. 1 illustrates a schematic view of a well system designed, manufactured and operated according to one or more embodiments of the disclosure.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "uphole," "upstream," or other like terms shall be construed as generally away from the bottom, terminal end of the well, regardless of the wellbore orientation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

FIG. 1 illustrates a schematic view of a well system 100 designed, manufactured and operated according to one or more embodiments of the disclosure. The well system 100 may include a wellbore 105 that comprises a generally vertical uncased section 110 that may transition into a generally horizontal uncased section 115 extending through a subterranean formation 120. In some examples, the vertical section 110 may extend downwardly from a portion of wellbore 105 having a string of casing 125 cemented therein. A tubular string, such as tubing 130 (e.g., production tubing), may be installed in or otherwise extended into wellbore 105.

In the illustrated embodiment, one or more production packers 135, well screens 140, and fluid flow control systems 145 may be interconnected along the tubing 130. In most systems, there are at least two sets of production packers 135, well screens 140, and fluid flow control systems 145 interconnected along the tubing 130. The production packers 135 may be configured to seal off an annulus 150 defined between the tubing 130 and the walls of wellbore 105. As a result, fluids may be produced from multiple intervals of the surrounding subterranean formation 120, in some embodiments via isolated portions of annulus 150 between adjacent pairs of production packers 135. The well screens 140 may be configured to filter fluids flowing into tubing 130 from annulus 150.

Each of the one or more fluid flow control systems 145, in one or more embodiments, may include a valve having a fluid inlet (e.g., production fluid inlet) operable to receive the fluid from the subterranean formation 120, a control inlet operable to receive the control fluid from a density control valve, and a fluid outlet (e.g., production fluid outlet) operable to pass the fluid from the subterranean formation 120 to the tubing 130. In at least one embodiment, the density control valve provides the control signal to the valve based upon the density of the fluid flowing there through. In at least one embodiment, the valve passes the fluid from the subterranean formation 120 to the tubing 130 based upon receiving, or not receiving, the control signal. For example, if the density control valve senses mud or oil, it would instruct and/or allow the valve to pass the fluid. In contrast, if the density control valve senses gas or water, it would instruct and/or allow the valve to prevent the fluid from passing from the subterranean formation 120 to the tubing 130. Details of the valve, density control valve, and their combination are discussed in great detail below.

Figure 2:
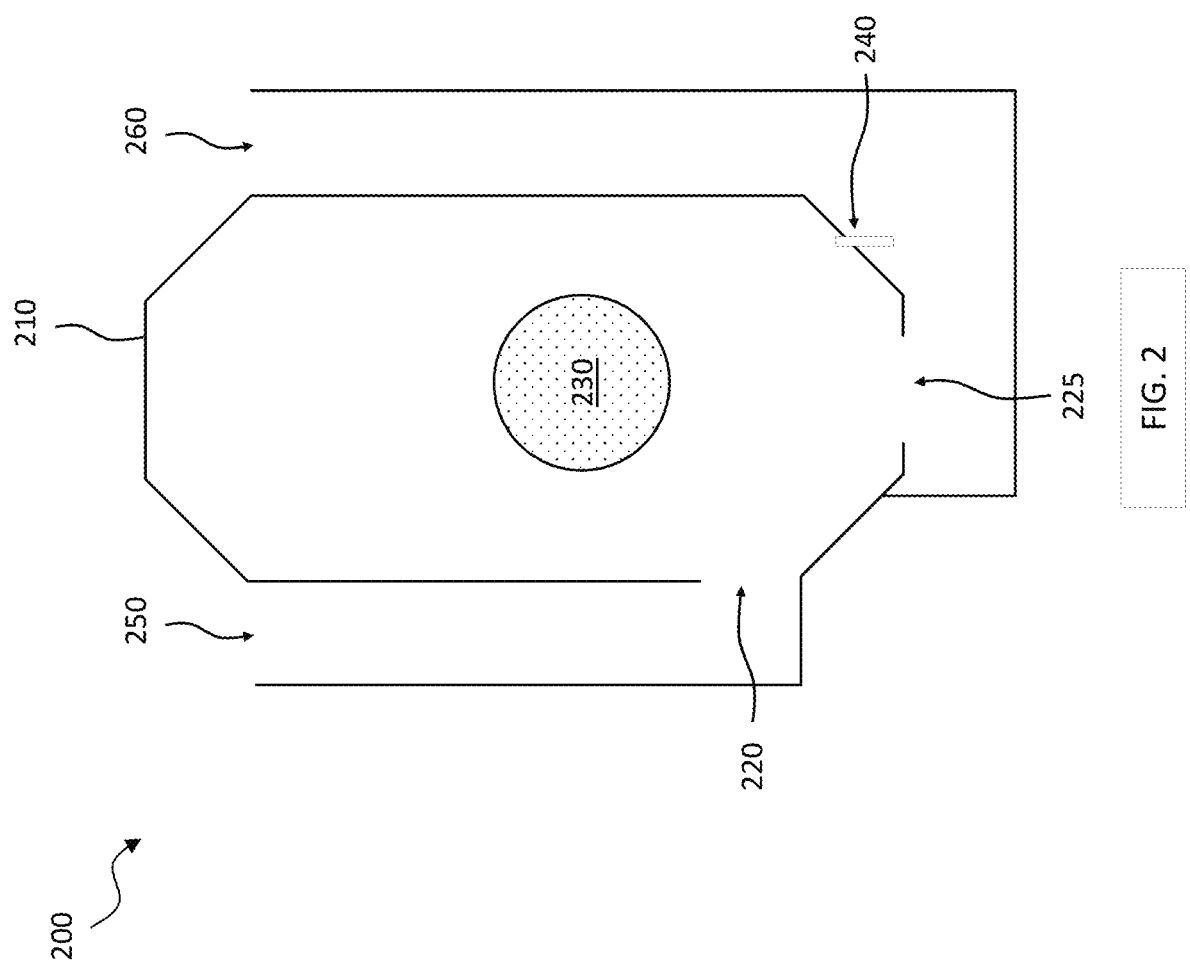
FIG. 2 illustrates a very basic configuration of a density control valve designed, manufactured and operated according to one embodiment of the disclosure.

FIG. 2 illustrates a very basic configuration of a density control valve 200 designed, manufactured and operated according to one embodiment of the disclosure. The density control valve 200, in at least one embodiment comprises a housing 210 provided with an inlet 220, and an outlet 225, which in one embodiment is arranged in a bottom portion of the housing 210. The housing 210 has an oblong form in certain embodiments.

A density dependent float 230, which in one embodiment is a ball, may be arranged within the housing 210. The density dependent float 230 has a density that is adapted to the density of relevant fluid to be controlled. The fluid to be controlled may be, without limitation drilling mud, oil, gas and water.

Figure 3:
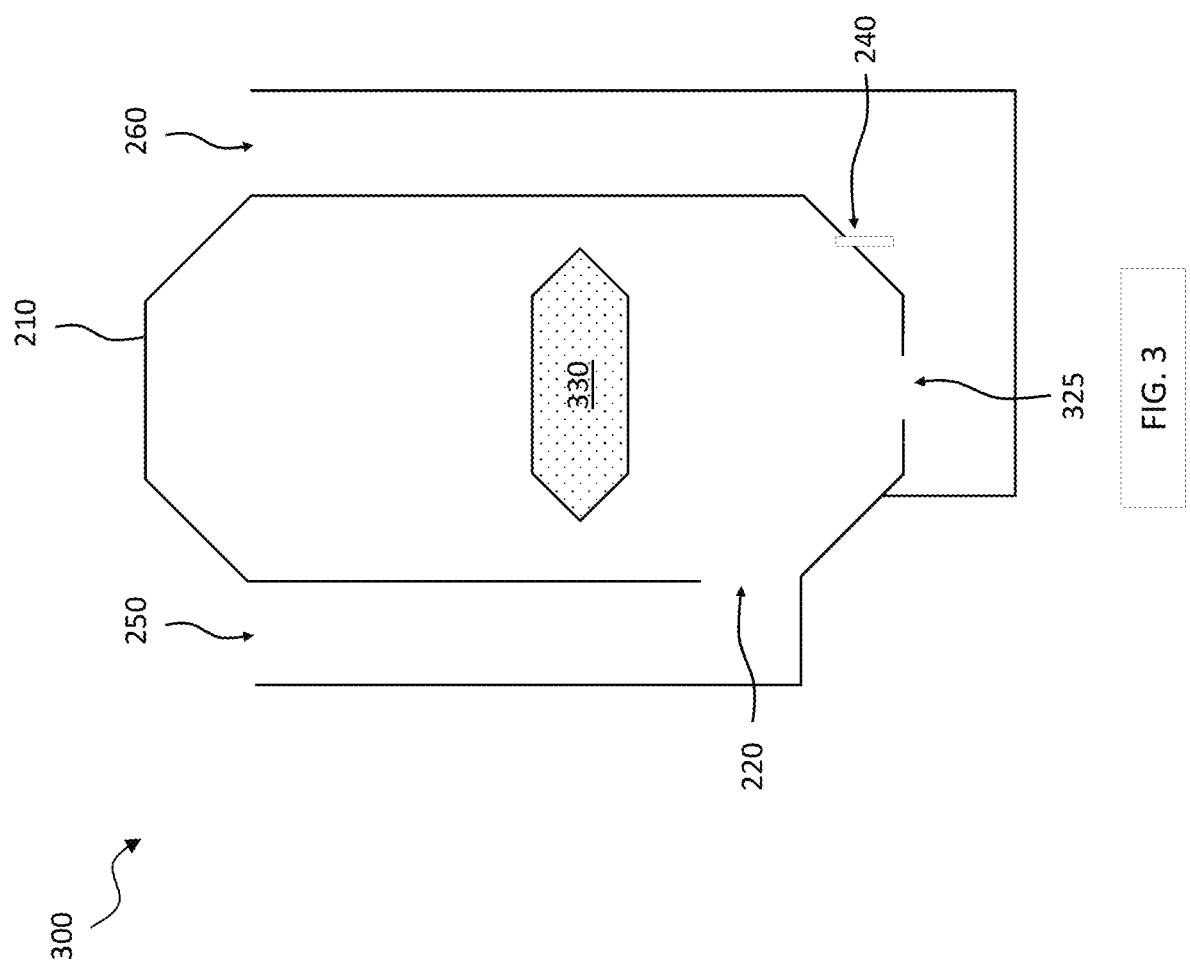
FIG. 3 illustrates one embodiment of a density control valve employing a larger density dependent float, at least as compared to the smaller outlet.

The size and form of the density dependent float 230 is adapted to be able to substantially block the outlet 225 when abutting it. Again, in certain embodiments the density dependent float 230 is a ball that seats within the outlet 225. In other embodiments, the density dependent float 230 is much larger than the outlet 225. For example, a cross-sectional area of the density dependent float 230 (e.g., the area of the density dependent float 230 that approaches the outlet 225) might be at least 50 percent larger than the area of the outlet 225. In yet another embodiment, the cross-sectional area of the density dependent float 230 might be at least 200 percent larger than the area of the outlet 225, and in certain other embodiments at least 500 percent larger, 1000 percent larger, or even greater. The increased size of the density dependent float 230, as compared to the outlet 225, helps to ensure that any buoyancy forces of the density dependent float 230 overcome any suction pressure at the outlet 225. Turning briefly to FIG. 3, illustrated is one embodiment of a density control valve 300 employing a larger density dependent float 330, at least as compared to the smaller outlet 325.

Returning to FIG. 2, the housing 210, in at least one embodiment, is further provided with a leakage path 240 for allowing continuous leakage of fluid out of the housing 210, even when the outlet 225 is blocked by the density dependent float 230. In FIG. 2 the leakage path 240 is meant to illustrate one or more apertures in the housing 210. Thus, a first fluid within the housing 210 may be displaced by a second fluid in a situation where inflow of fluid into the density control valve 200 changes. The importance of the leakage path 240 will be understood when studying FIG. 5C, wherein the apparatus is blocking flow of a gas through the density control valve 200. Without the leakage path 240 in the mid-housing 210", any gas entrapped in the housing 210" could not be displaced by another fluid of higher density if the inflow of fluid is changing. Thus, the density dependent float 230" within the housing 210" would still block the outlet 225 and thereby still block fluid flow through the density control valve 200.

The density control valve 200 in FIG. 2 is further provided with an inlet conduit 250 and an outlet conduit 260. The inlet conduit 250 is often in direct communication with the annular space outside the tubing (e.g., tubing 130 of FIG. 1). The annular space is in fluid contact with the subterranean formation (e.g., subterranean formation 120 of FIG. 1), and the flow from the subterranean formation could or could not be filtered by e.g. a screen before entering the inlet conduit 250. The outlet conduit 260, is in fluid communication with the tubing (e.g., tubing 130 of FIG. 1).

Figure 4:
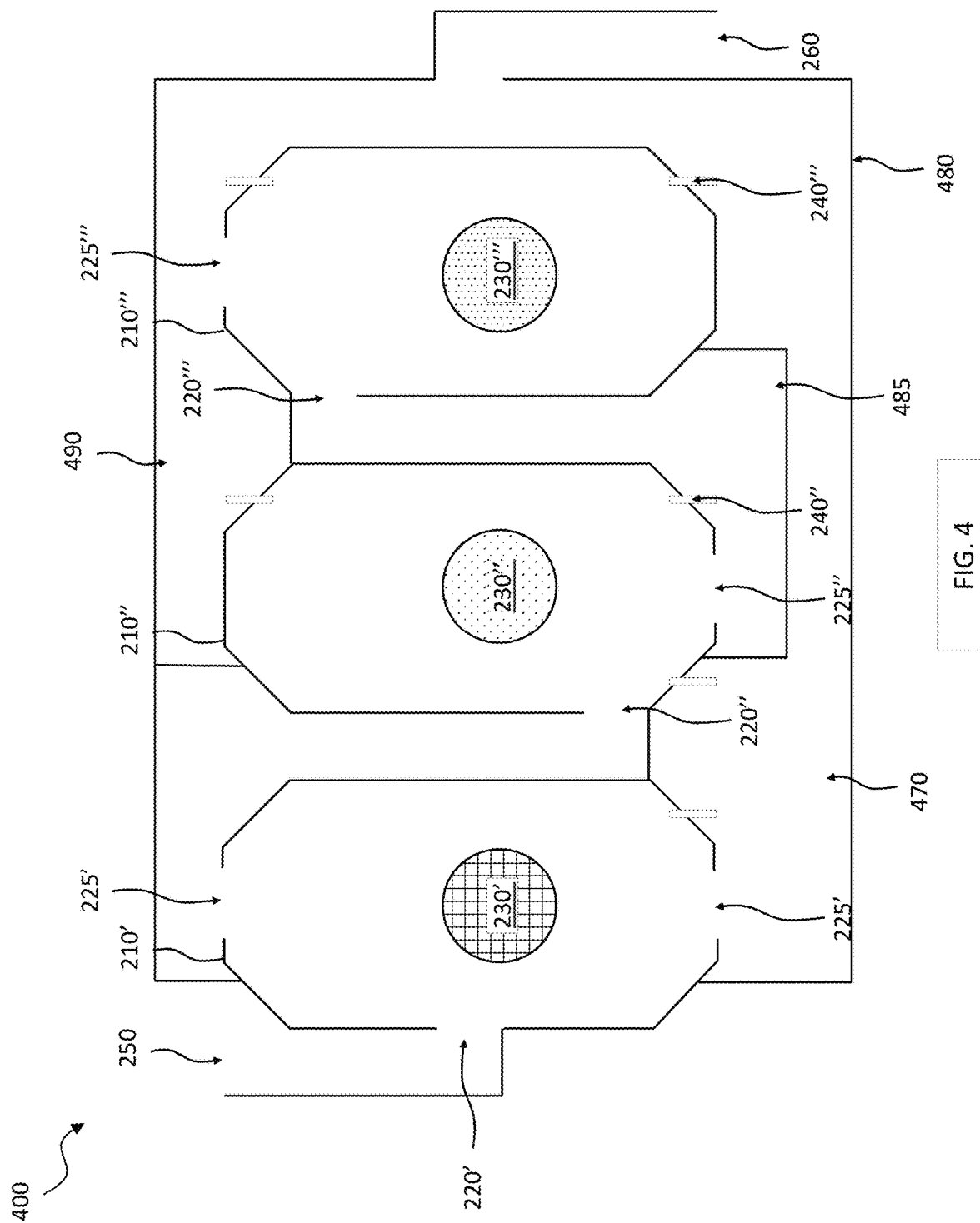
FIG. 4 illustrates a density control valve designed, manufactured and operated according to an alternative embodiment of the disclosure.

Turning to FIG. 4, illustrated is a density control valve 400 designed, manufactured and operated according to an alternative embodiment of the disclosure. The density control valve 400 is similar in many respects to the density control valve 200 of FIG. 2. Accordingly, like reference numbers have been used to indicate similar, if not identical, features. In contrast to the density control valve 200, the density control valve 400 includes multiple (e.g., three in the illustrated embodiment), housings 210, inlets 220, outlets 225, and density dependent floats 230 arranged in series. In FIG. 4, following from left to right, the multiple housings 210 will be denoted with the reference numbers 210', 210", 210''', the multiple inlets 220 will be denoted with the reference numbers 220', 220", 220''', the multiple outlets 225 will be denoted with the reference numbers 225', 225", 225''', and the density dependent floats 230 will be denoted with the reference numbers 230', 230", 230''', respectively.

In FIG. 4 density dependent floats 230' has a grid-like surface pattern illustrating a series of ridges and valleys providing a non-even surface. The purpose of the non-even surface is to provide a leakage path allowing a small leakage or seep of fluid between the periphery of the outlet 225' and the density dependent float 230', when it abuts the outlet 225'. Note that the leakage path in the left housing 210' is provided by the non-even surface of the density dependent float 230'. In contrast, the housing 210", 210' include the leakage paths 240", 240''', respectively. As an alternative to, or in addition to, the non-even surface of the density dependent float 230', the leakage path may be provided by means of an outlet 225", 225' having a periphery being non-compliant with the surface of a density dependent float 230", 230''' having an substantially smooth surface.

The housing 210' is provided with an inlet 220', which is in fluid communication with the inlet conduit 250 of the density control valve 400. The housing 210' is further provided with a bottom outlet 225' and a top outlet 225' arranged in the bottom portion and in the top portion, respectively. The bottom outlet 225' is in fluid communication with the outlet conduit 260 via a bypass channel 470. The top outlet 225' is in fluid communication with an inlet 220" of the housing 210".

The housing 210" is provided with a bottom outlet 225", which is in fluid communication with the inlet 220' of the housing 210'". The housing 210'" is provided with a top outlet 225'", which is in fluid communication with the outlet conduit 260 of the density control valve 400.

The density control valve 400 is provided with an outer enclosure 480 and compartment elements, 485, 490, as shown in FIG. 4. The outer enclosure 480 and the compartment elements 485, 490 are configured to provide the desired flow communications within and out of the density control valve 400.

It is emphasized that the configuration shown in FIG. 4 is only one example of a configuration of a density control valve 400, and that different arrangements, order of housings 210', 210", 210'" and/or density dependent floats 230', 230", 230'", or other configurational variations of the density control valve 400 may be provided by the present disclosure.

Turning to FIGS. 5A through 5D, illustrated is the density control valve 400 of FIG. 4 at different stages of the well life of an oil producing well. Note that in FIGS. 5A through 5D, the non-even surface density dependent float 230' shown in FIG. 4 is replaced by a density dependent float 530' having a similar surface as the density dependent floats 230", 230'", and that the housing 210' is provided with a leakage path 540'.

The direction of fluid flow into and out of the density control valve 400 is indicated by solid arrows, or lack of flow with dotted arrows. In FIGS. 5A through 5D, the density of the density dependent float 530' is higher than that of oil, water and gas, but lower than that of mud. The mud may for example be drilling mud or a well construction mud. The density of the density dependent float 230" is higher than that of gas, but lower than that of mud, oil and water. The density of the density dependent float 230'" is higher than that of gas and oil, but lower than that of mud and water. For the purpose of this discussion, the specific gravity of water may be between 0.95 and 1.05, and the specific gravity of mud may be between 1.06 and 2. In at least one embodiment, the water may have a specific gravity between 1 and 1.04 and the mud may have a specific gravity between 1.06 and 1.10. In at least one other embodiment, the water may have a specific gravity of 1.02 and the mud may have a specific gravity of 1.06.

Figure 5A:
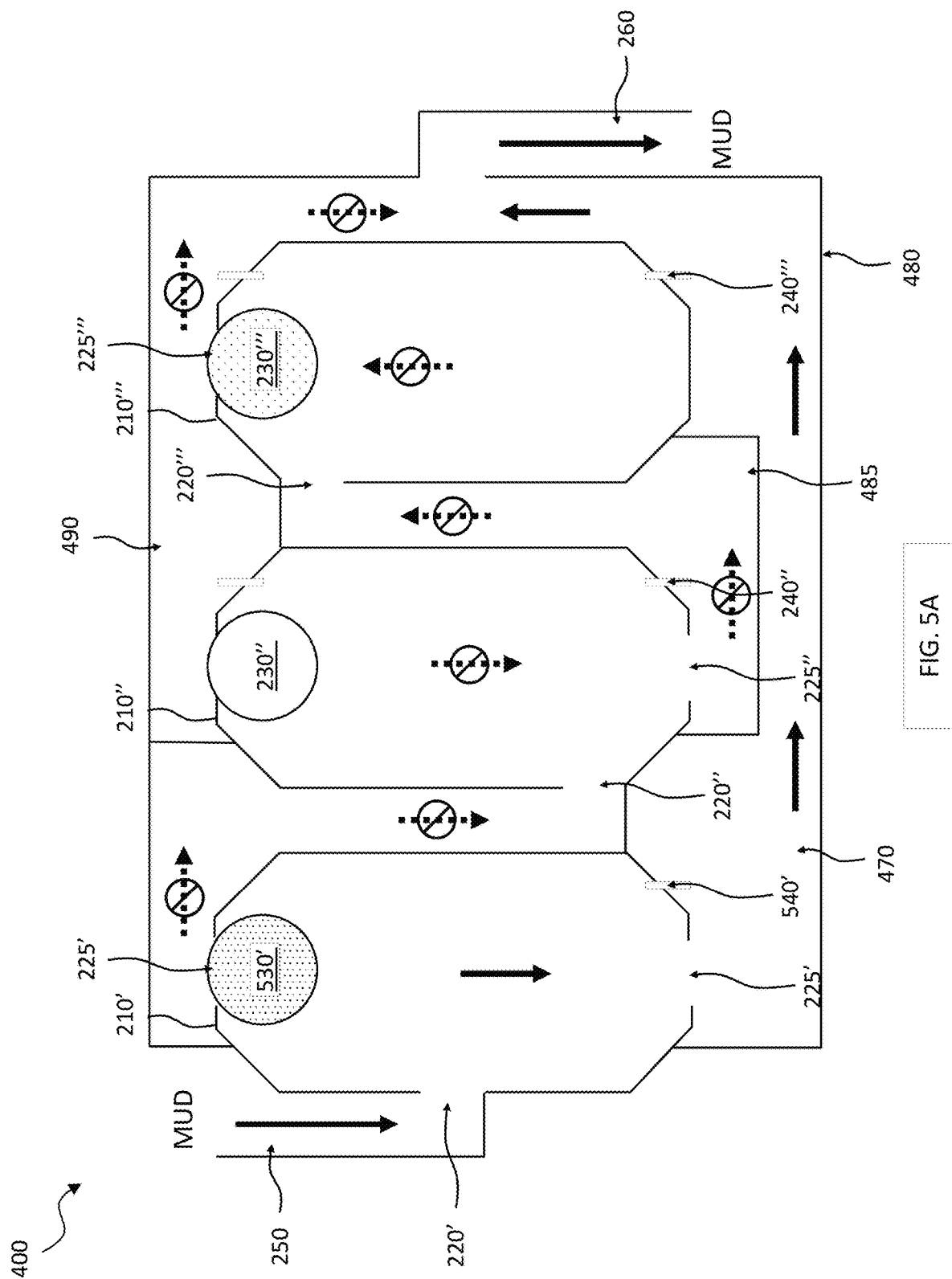
Figure 5B:
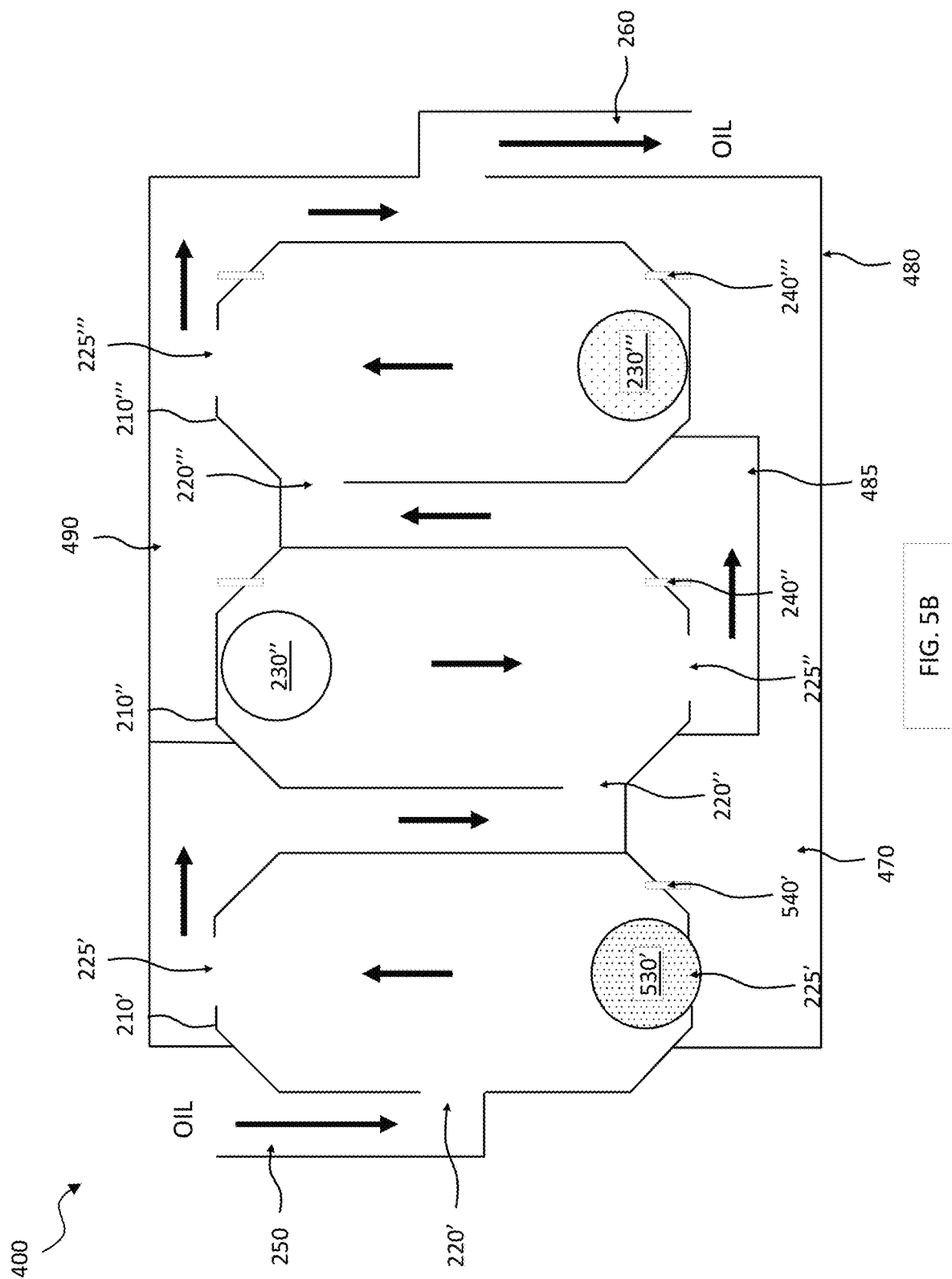
Figure 5D:
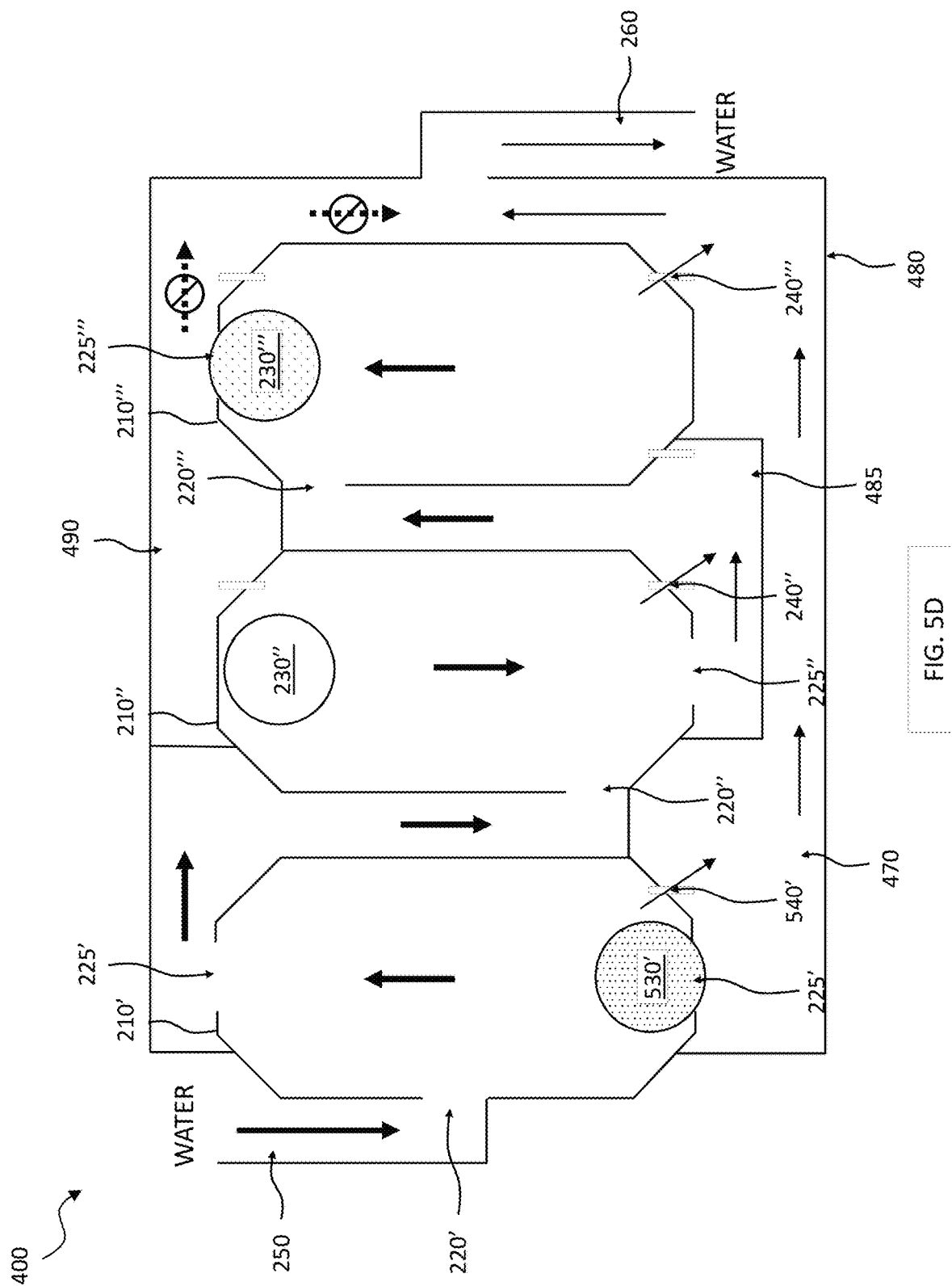

In FIG. 5A, mud will flow through the density control valve 400 from the inlet conduit 250 to the outlet conduit 260. In FIG. 5B, oil will flow through the density control valve 400 from the inlet conduit 250 to the outlet conduit 260. In FIGS. 5C and 5D, gas and water, respectively will be substantially restricted from flowing through the density control valve 400. The only passage of the gas and water through the density control valve 400 is via the leakage paths 540', 240", 240'". This very limited flow is indicated by small arrows in the inlet conduit 250 and outlet conduit 260.

The reason for the foregoing, may be explained as follows. After entering the inlet conduit 250 of the density control valve 400, the fluid flow enters the left housing 210', which is designed to bypass well construction fluids through the bypass channel 470 directly to the outlet conduit 260. Due to the density of the density dependent float 230' being higher than the formation water (second densest fluid) and lower than the well construction fluid (densest fluid), the dense well construction fluid is present in all spaces in the density control valve 400 prior to well start-up/cleanup. This means that the density dependent floats 530', 230", 230'" will initially be positioned at the top portion of the housings 210', 210", 210'", respectively, due to their buoyancy with respect to the dense well construction fluid.

During initial well start-up/cleanup, the well will thus start flowing construction fluid through the inlet conduit 250 and the bypass channel 470 to the outlet conduit 260 as shown in FIG. 5A. Simultaneously there will be a small flow through the leakage paths 540', 240", 240'" and the outer enclosure 480.

Initially, the flow will substantially comprise well construction fluids. After some time, the well construction fluid will be cleaned out and reservoir fluid will start to flow. In the configuration shown in FIGS. 5A through 5D, the density control valve 400 is designed to let through oil, and restrict gas and water from the reservoir. Assuming the reservoir fluid produced after cleanup of the well construction fluid is oil, the density of the density dependent float 530' is such that it will lose its buoyancy in the reservoir fluid.

However, due to the suction forces in the top outlet 225' of the housing 210', the density dependent float 530' will keep its position. The leakage paths 540', 240", 240' and outer enclosure 480 will facilitate total fluid displacement in the subsequent housings 210", 210'".

After substantially all of the well construction fluid is displaced by oil, the density dependent float 230" will, due to its density between the densities of gas and oil, maintain its position at the top of the housing 210". The density dependent float 230' will, due to its density higher than that of oil and lower than that of water, sink to a position at the bottom of the housing 210'".

Due to the suction forces in the top outlet 225' of the housing 210', the density dependent float 530' will keep its position, as mentioned above. This means that neither housing 210" nor housing 210'" is supplied with fluid from the outlet of the housing 210'. Thus, the fluid flows via the bypass channel 470 through the density control valve 400. This flow pattern will continue until the well has its first production shut down, typically as part of a start-up procedure when so-called well cleanup is satisfactory.

After re-start-up of the well after a first planned production shutdown, the density dependent floats 530', 230", 230' will have found their correct positions for the current reservoir fluid, as shown in FIG. 5B.

Assuming oil is flowing from the reservoir, density dependent float 530' will sink and block bottom outlet 225' due to its density between the densities of water and the well construction fluid. The flow will then be forced to pass through the top outlet 225' and into the housing 210". There, the density dependent float 230" will be buoyant due to its density between the densities of oil and gas, and the fluid will flow unrestricted through the housing 210" and out the outlet 225" via compartment element 485 into the housing 210" '. In the housing 210'", the density dependent float 230'" will, due to its density higher than that of oil and lower than that of water, be positioned at the bottom of the housing 210'", and the fluid will pass unrestricted through the housing 210'" and via compartment element 490 to the outlet conduit 260.

In a later stage of the well life, if gas coning or any other phenomena introduces free gas in the fluid stream from the reservoir through the density control valve 400, the density dependent float 230" will lose its buoyancy and drop down to block the main flowpath through outlet 225" of the housing 210" as shown in FIG. 5C.

If the gas-oil contact later pulls back and the formation surrounding the density control valve 400 is refilled to oil, the old fluid (gas) in the density control valve 400 will be displaced to the new fluid (oil) by the continuous leak flow through the leakage paths 540', 240", 240'". Without the leakage paths 540', 240", 240''', or any other leakage means, the high or low density fluid activating the density dependent floats 530', 230", 230''' will likely not be displaced and re-opening would be disabled. Thus, the leakage paths 540', 240", 240''' will prevent fluid from being "trapped" within the density control valve 400, and the density control valve 400 will be autonomous also for such a situation.

The leakage paths 540', 240", 240''' are located or arranged in the housings 210', 210", 210''' in such a way that there are substantially no zones where any type of fluid is trapped when a new fluid is surrounding the inlet conduit 250 of the density control valve 400.

If water is introduced by water coning or other phenomena, the density dependent float 230''' will, due to its density below that of water, become buoyant and rise to block the main flow through the top outlet 225''' of the housing 210''', and thus through the density control valve 400. This is shown in FIG. 5D.

Figure 6A:
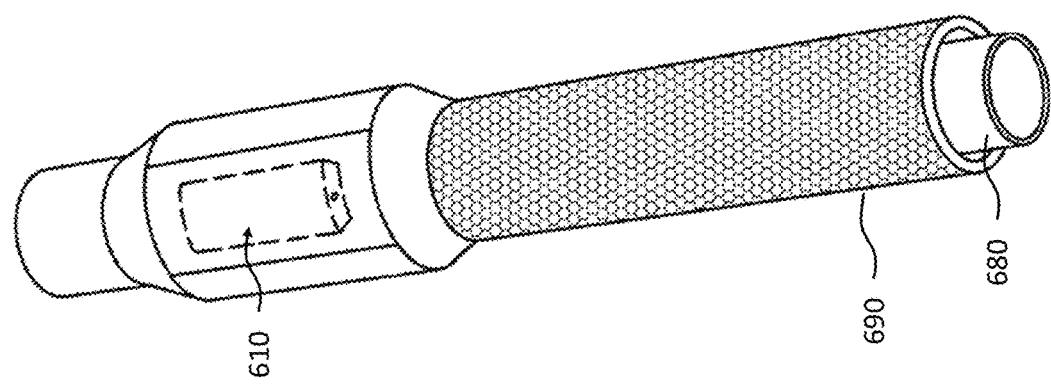
FIG. 6A illustrates one embodiment of a completion string, which could include a density control valve similar to one or more of the density control valves discussed herein.

Turning to FIG. 6A, illustrated is one embodiment of a completion string 600, which could include a density control valve 605 similar to one or more of the density control valves discussed above. In the illustrated embodiment, the density control valve 605 is positioned between a basepipe 680 and a screen 690. The density control valve 605 may form part of a so-called pipe stand having a typical length of approx. 12 meters. However, the density control valve 605 may also be arranged in a separate pipe unit having a typical length of only 40-50 centimeters. Such a unit may be configured to be inserted between two subsequent pipe stands.

Figure 6C:
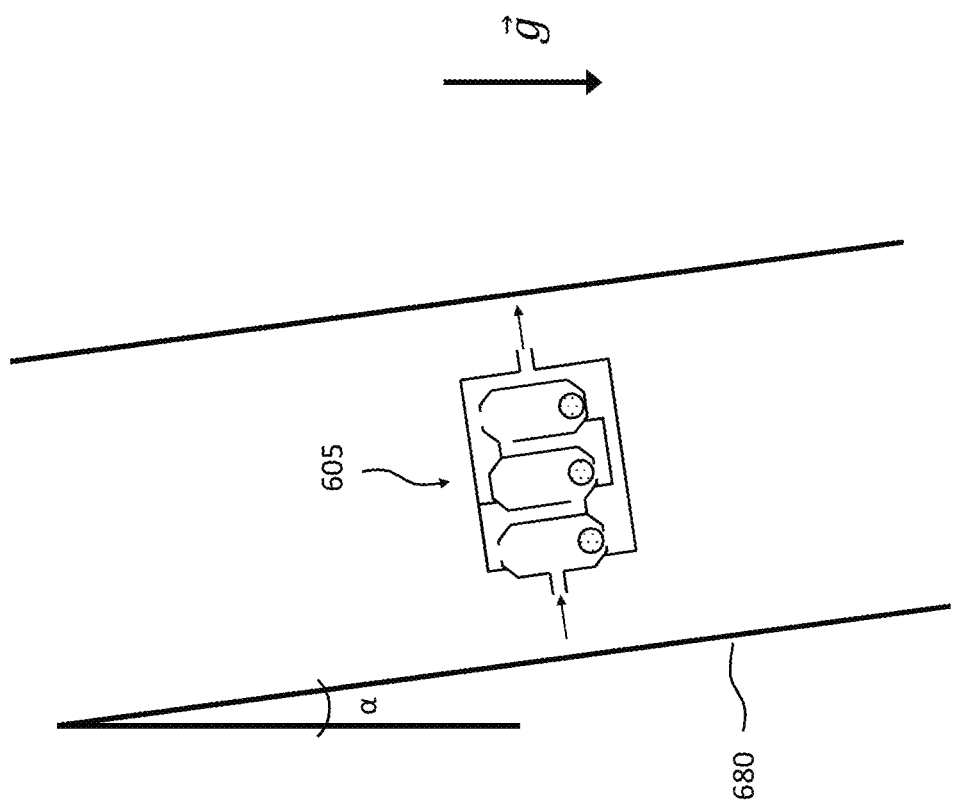
FIG. 6C illustrates a typical placement of a density control valve in a vertical or deviated well.

FIG. 6B shows typical placement of the housing 610 and density dependent float 630 of the density control valve 605 in a cross section of the completion string 600. The placement shown in FIG. 6B is precisely placed with respect to the gravitational vector g, but rotation around the basepipe 620 axis up to a certain angle is acceptable. As the density control valve 605 is orientation dependent, proper orientation of the density control valve 605 around the basepipe 680 axis is desired in horizontal or near-horizontal sections of the well. In vertical or deviated sections of the well, orientation around the basepipe 680 axis might not be required. Typical placement of a density control valve 605 in a vertical or deviated well is shown in principle in FIG. 6C.

Ensuring correct orientation of the density control valve 605 (or the density control valve 400 as shown in FIG. 4) in a horizontal section could be handled using an appropriate tool when running the completion. One known way of ensuring correct orientation is by allowing the specific part of each completion section (e.g., where the apparatus is installed) to rotate freely. Further to this embodiment, a specifically designed wire-line tool may be used to position and lock each section to its correct orientation prior to well start-up. An alternative to forced orientation by a wire-line tool is to design the apparatus with a heavy section, thereby allowing the apparatus to self-rotate into correct orientation prior to initial well start-up. To lock the apparatus in its correct position, a hydrocarbon swelling packaging could be installed on the rotating section to swell and lock position with a formation wall.

Figure 7:
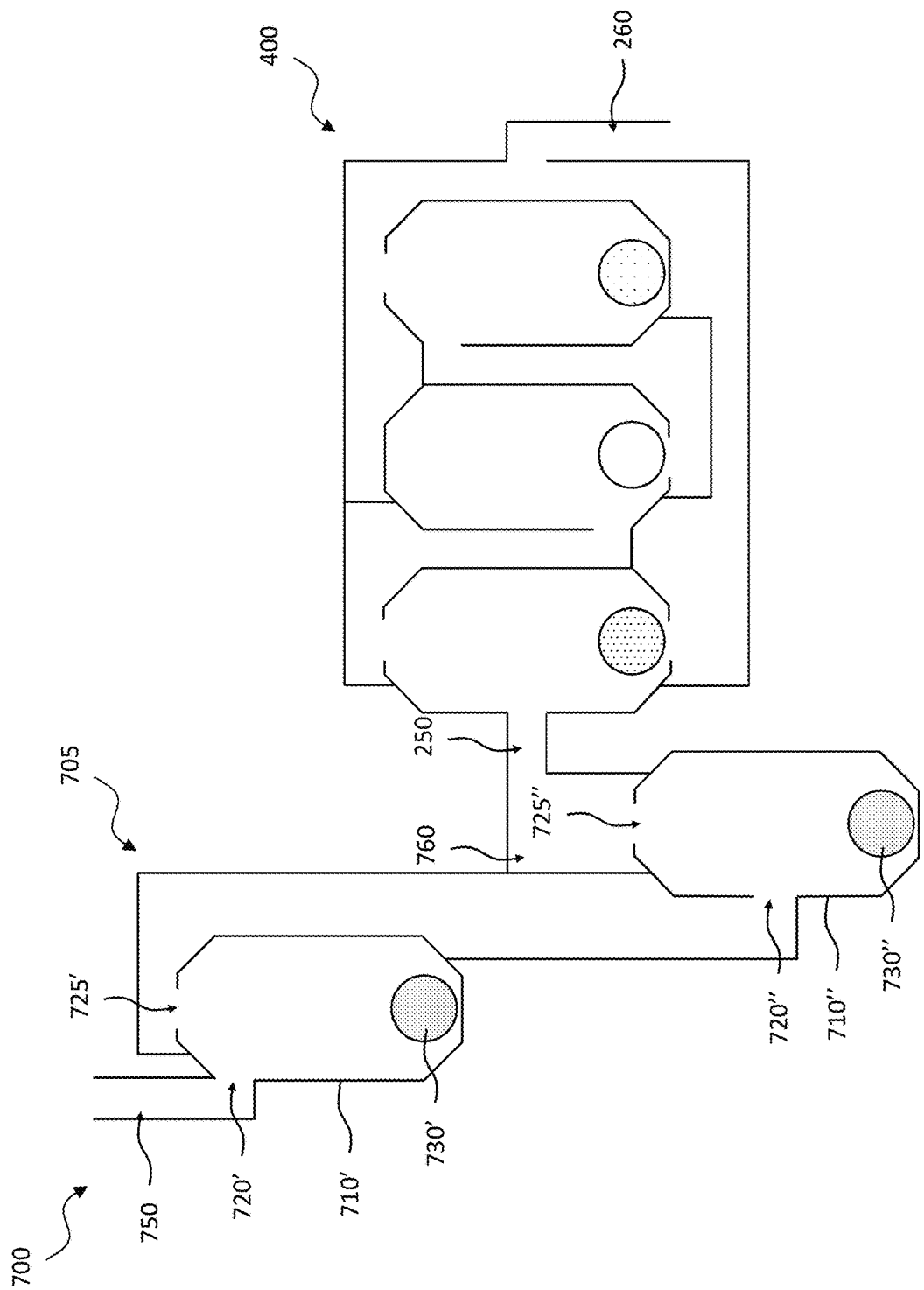
FIG. 7 illustrates one embodiment of a density control system that might be used to assist with the orientation issues discussed herein.

Turning to FIG. 7, illustrated is one embodiment of a density control system 700 that might be used to assist with the orientation issues discussed above. The density control system 700 is similar in many respects to the density control valve 400 discussed above with regard to FIG. 4. Accordingly, like reference numbers have been used to indicate similar, if not identical, features. In contrast to that of FIG. 4, the density control system 700 includes an orientation dependent inflow control apparatus 705. For example, in FIG. 7, the inlet conduit 250 of the density control valve 400 is in fluid communication with an outlet 760 of the orientation dependent inflow control apparatus 705. The purpose of the orientation dependent inflow control apparatus 705 is to control fluid flow from an outside to an inside of a pipe in a deviated or horizontal well. The orientation dependent inflow control apparatus 705 will hereinafter also be denoted as an autonomous orientation interpreting apparatus. The orientation dependent inflow control apparatus 705 is an alternative to forced orientation and self-orientation as discussed above.

The orientation dependent inflow control apparatus 705 in FIG. 7 includes a first orientation housing 710' having a longitudinal axis and being provided with a first orientation inlet 720' and a first orientation outlet 725'; a second orientation housing 710" having a longitudinal axis and a second orientation inlet 720" and a second orientation outlet 725". The orientation outlets 725', 725" are arranged in an end portion of the housings 710', 710", respectively. The first orientation outlet 725' is in fluid communication with the second orientation inlet 720", and the second orientation outlet 725" is arranged for fluid communication with the inlet conduit 250 of the density control valve 400, according to the first aspect of the disclosure.

Blocking members 730', 730" are arranged within each of the housings 710', 710", respectively. The blocking members 730', 730" are configured for allowing blockage of the orientation outlets 725', 725" for shutting off fluid flow through the orientation dependent inflow control apparatus 705. The blocking members 730', 730" have a density being higher than that of the well fluid with the highest density possible during the lifespan of the well, or lower than that of a well fluid with lowest density during the lifespan of the well. Steel is an example of a suitable material for use as a high-density blocking member.

The first orientation housing 710' and the second orientation housing 710" are arranged mutually distant in or at a perimeter of a pipe such that an angle of inclination of the first orientation housing 710' is different from that of the second orientation housing 710". Thus, the flow through the orientation dependent inflow control apparatus 705 may be blocked either by the blocking member 730' in the first orientation housing 710', or by the blocking member 730" in the second orientation housing 710".

When rotated around a basepipe axis above a predefined angle, the blocking member 730' will abut and block the orientation outlet 725' of the first orientation housing 710', and thus prevent a fluid flow through the orientation dependent inflow control apparatus 705 and into the subsequent density control valve 400.

When rotated around the basepipe axis below a predefined angle, the blocking member 730' will be positioned in a lower portion of the orientation housing 710'. The fluid may then flow out through the outlet of the first orientation housing 710'. However, because the orientation dependent inflow control apparatus 705 is rotated below a predefined angle, the blocking member 730" will abut and block the orientation outlet 725" of the second orientation housing 710", and thus prevent a fluid flow through the orientation dependent inflow control apparatus 705 and into the subsequent density control valve 400.

When the orientation dependent inflow control apparatus 705 is arranged at a predefined angle, which may be a span of angles, both of the blocking members 730' and 730" will be positioned away from the orientation outlets 725', 725"

and fluid may flow through the orientation dependent inflow control apparatus 705 and into the density control valve 400.

By arranging a plurality of orientation dependent inflow control apparatus 705, for example independently of each other and for example equidistantly around the perimeter of the basepipe, at least one of the orientation dependent inflow control apparatuses 705 should be within a desired predefined angle, and thus enable fluid flow through the orientation dependent inflow control apparatus 705 and assure the correct functionality of the density control valve 400 according to the first aspect of the disclosure. In at least one embodiment, this occurs without risk of unwanted fluid bypassing the density dependent floats 230', 230", 230'". The density control valves 400 around the perimeter of the basepipe being positioned at unfavorable angles will be disabled by the orientation dependent inflow control apparatus 705.

Figure 8:
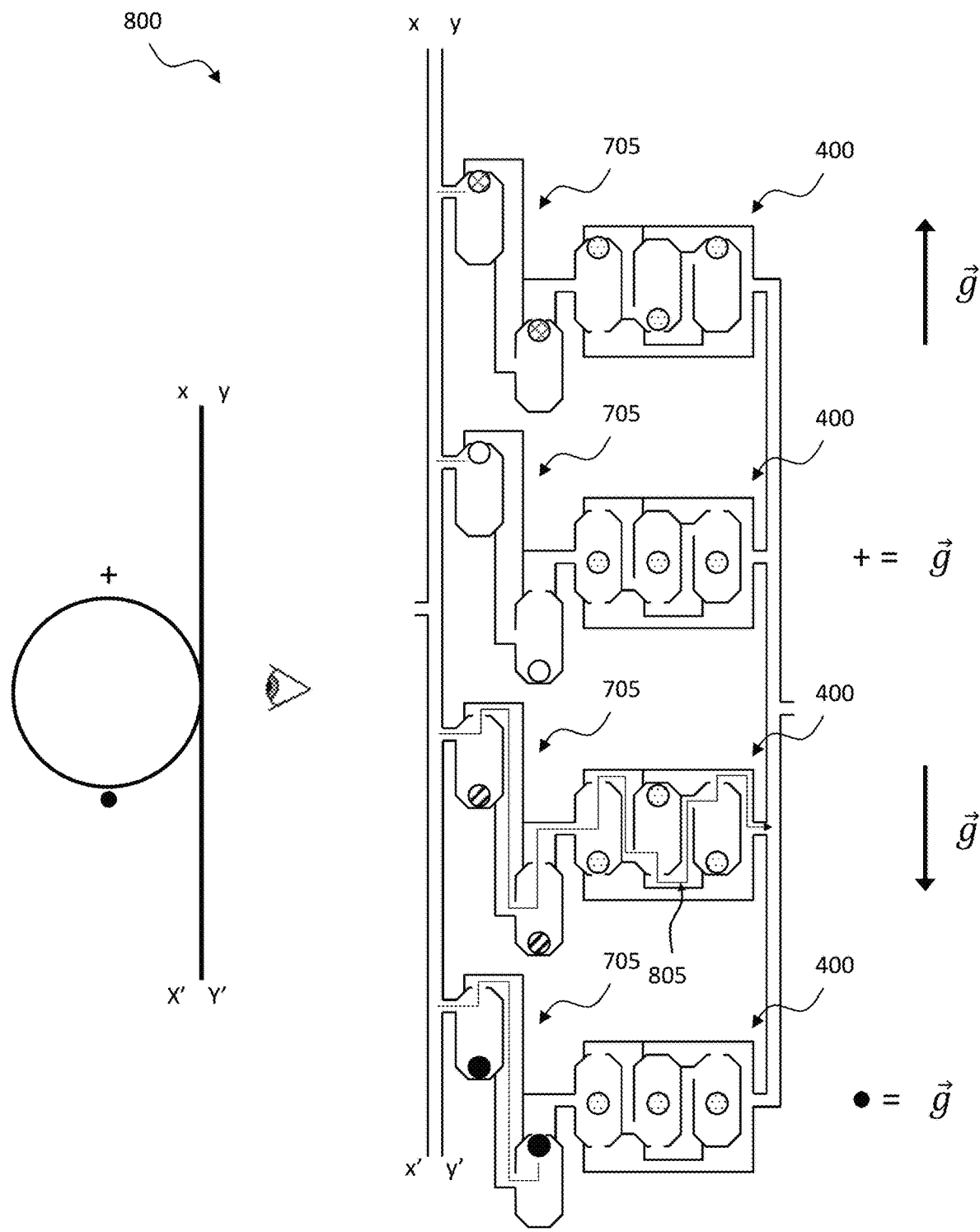
FIG. 8 illustrates a rolled-out view (360°) of a device comprising four orientation dependent inflow control apparatuses equidistantly distributed around the perimeter outside of a basepipe.

FIG. 8 illustrates a rolled-out view (360°) of a device comprising four orientation dependent inflow control apparatuses 705 equidistantly distributed around the perimeter outside of a basepipe (not shown). In FIG. 8 the reference indications x and x' are connected to one another, as well as the reference indications y and y' are connected to one another.

Each of the four orientation dependent inflow control apparatuses 705 is in fluid communication with a corresponding density control valve 400 (e.g., as disclosed for example in FIG. 7) to form a density control valve system 800. The orientation of each of the four orientation dependent inflow control apparatuses 705 is indicated by the g-vectors (g) where the indication + is to be understood to be in a direction into the drawing, the downward arrow is in a direction vertically down, the ○ is in a direction out of the drawing and the upward arrow is in a direction vertically up.

The density control valve system 800 in the embodiment shown in FIG. 8 is assumed to be placed in an oil well in a section where oil is being produced. In order to facilitate the understanding of FIG. 8, each pair of blocking members 730', 730" of each of the orientation dependent inflow control apparatuses 705 are indicated by dissimilar hatching. However, it should be understood that all of the eight blocking members 730', 730" may be identical and that the dissimilar hatchings only serve to identify pairs of blocking members 730', 730" within each of the four orientation dependent inflow control apparatuses 705.

As shown in FIG. 8 only one of the four orientation dependent inflow control apparatuses 705 has an orientation where both of the blocking members 730', 730" have a position in a bottom portion of their respective housings 710', 710", and thus allow fluid flow through the orientation dependent inflow control apparatus 705 and into the subsequent density control valve 400. The flow is indicated by an arrow 805. Note that the density control valve 400 which is open to fluid flow there through corresponds to the apparatus shown in FIG. 5B.

For the other three orientation dependent inflow control apparatuses 705, at least one of the blocking members 730', 730" block an orientation outlet 725', 725" of the respective housings 710', 710", and thus prevents a flow of fluid through the orientation dependent inflow control apparatuses 705 and into the subsequent density control valve 400.

As mentioned above, the blocking members 730', 730" in each of the four orientation dependent inflow control apparatuses 705 shown in FIG. 8 often have the density of steel and will find their correct position regardless of type of fluid surrounding them.

If lower density blocking members 730', 730" (e.g., having a density lower than that of steel) were used instead of the higher density blocking members 730', 730" shown in the FIGs., a person skilled in the art will understand that the outlets from the 710', 710" must be arranged in the opposite portion of the orientation dependent inflow control apparatuses 705, such that the outlet of each 710', 710" is blocked when the blocking members 730', 730" "float up".

To ensure reliable operation of the orientation dependent inflow control apparatuses 705, the housings 710', 710" could be provided with a substantially flat portion or floor. If a flat portion or floor is not used in the housings 710', 710", the placement of these housings 710', 710" should take into account that the completion string is normally rotated during installation. If low density blocking members 730', 730" were used (not shown), the flat portion should be arranged in the top portion or "roof" of the housings 710', 710".

The discussion above is an example of one way of using the density control valve 400 and density control valve system 700, 800 according to the present disclosure. However, the density control valve 400 and density control valve system 700, 800 may be tailor made for specific purposes.

The density control valve 400 and density control valve system 700, 800 could be optimized for use in so-called gas producers, as to only discriminate water in a gas/condensate producer. This could be achieved by simply removing the flow control means or density dependent float 230', or by removing the entire housing 210' so that the density control valve 400 comprises only two housings 210", 210'" instead of the three housings 210', 210", 210'" as shown in FIG. 4. The same configuration could be used for under saturated oil producers, where gas is not expected through the lifetime of the well. Similarly, the apparatus in FIG. 4 could be designed to only discriminate gas by removing the flow control means or density dependent float 230", or by removing the entire housing 210".

The present disclosure has newly recognized that density control valves, such as the density control valves disclosed above, can be problematic when used as the primary control valve. Specifically, when used as the main control valve, the density control valves depend on the density dependent floats to control the main flow from the annulus to the tubing. However, in doing so, the suction pressure from the drawdown may to too high to allow the buoyancy forces to control the density dependent floats, and thus make the density control valves not work for their intended purpose. The present disclosure has recognized that the foregoing problem may be addressed by making the density control valves only control a small portion of the flow, and the small portion then be used to provide control for a valve, which is used to control the main flow from the annulus to the tubing. As the pressure drop across the density dependent floats is small with the lower flow rate, they do not experience the suction pressure issues, and thus work well as the control valve for the main valve.

Figure 9:
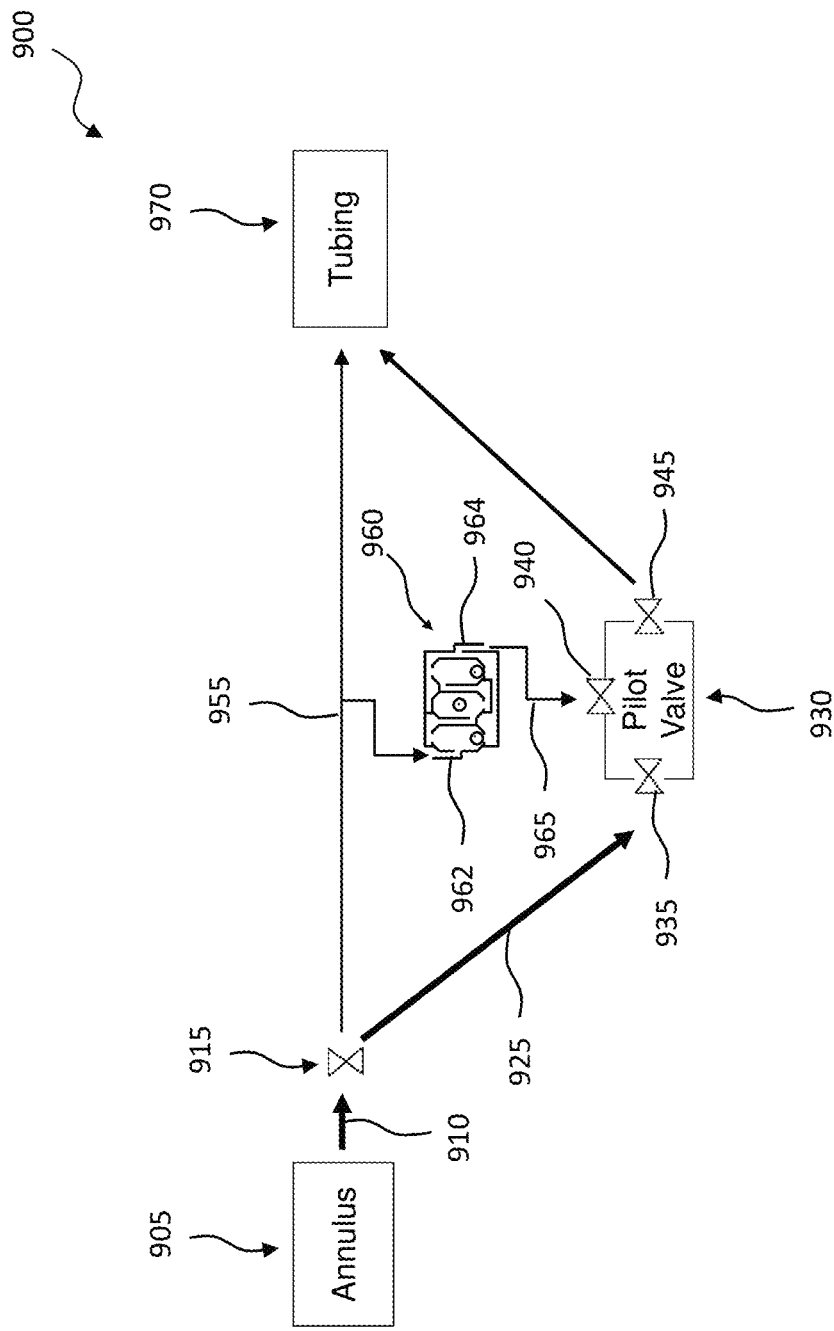
FIG. 9 illustrates a fluid flow control system designed, manufactured and operated according to one or more embodiments of the disclosure.
Figure 10A:
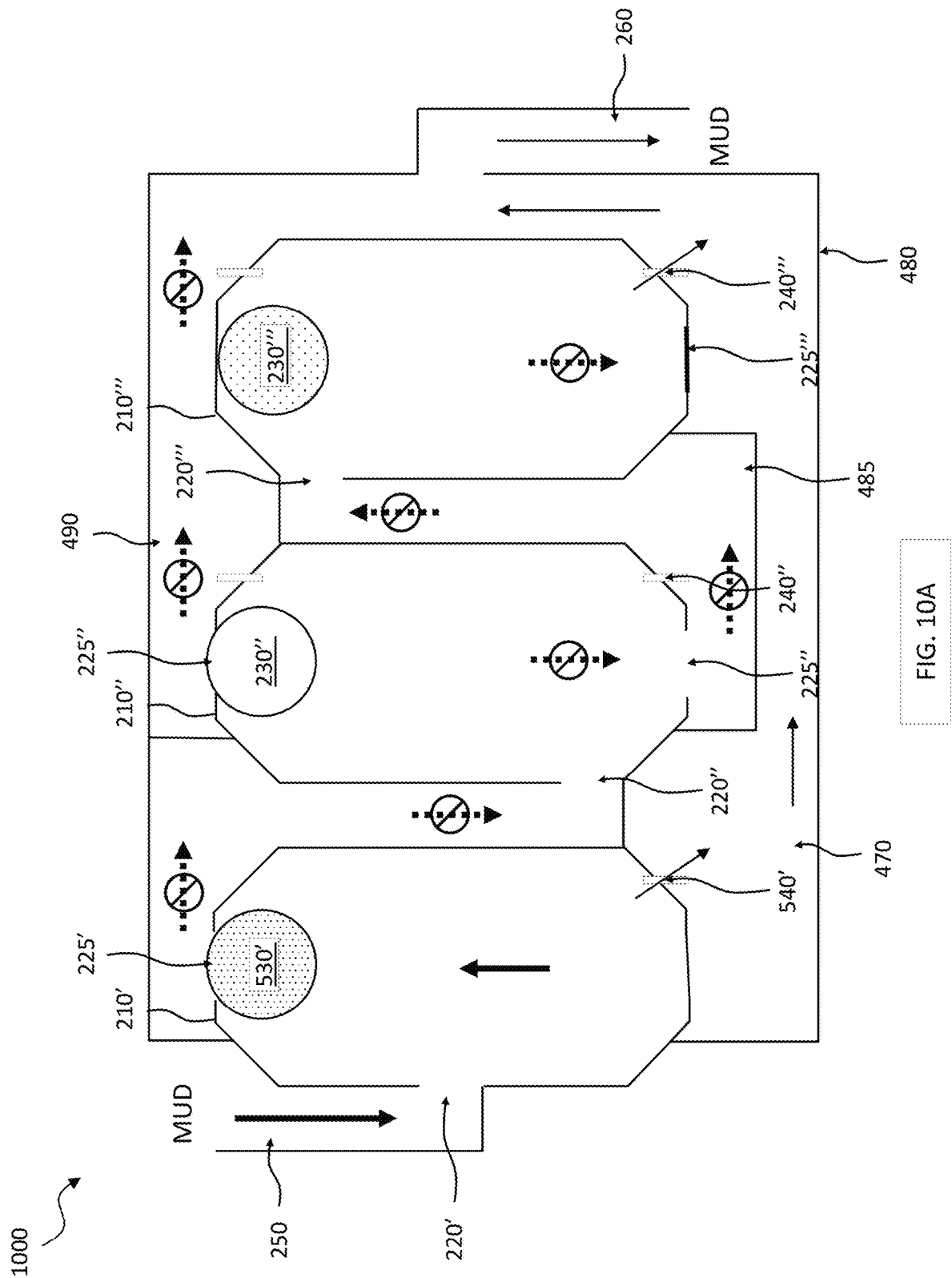
Figure 10B:
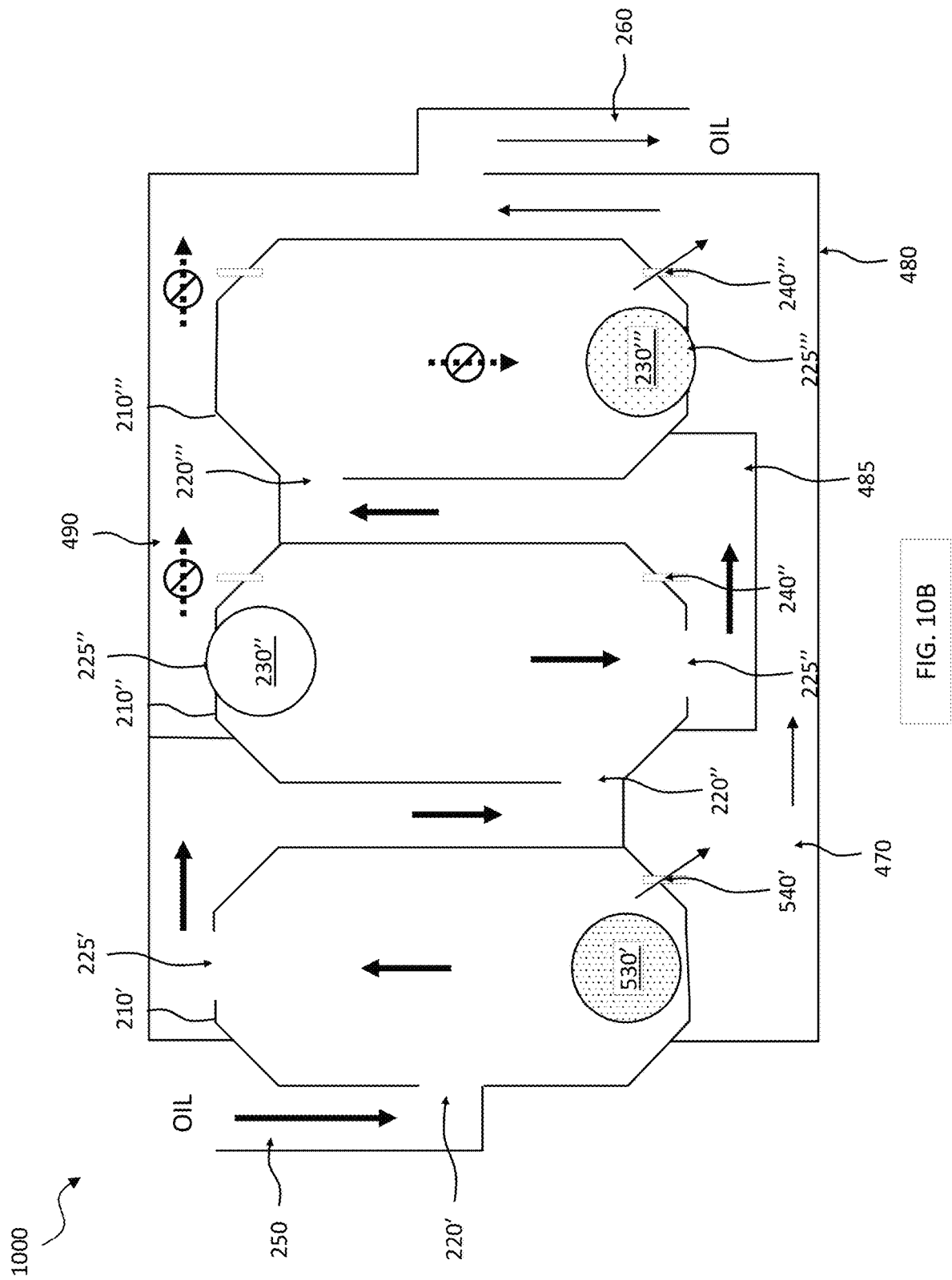
Figure 10D:
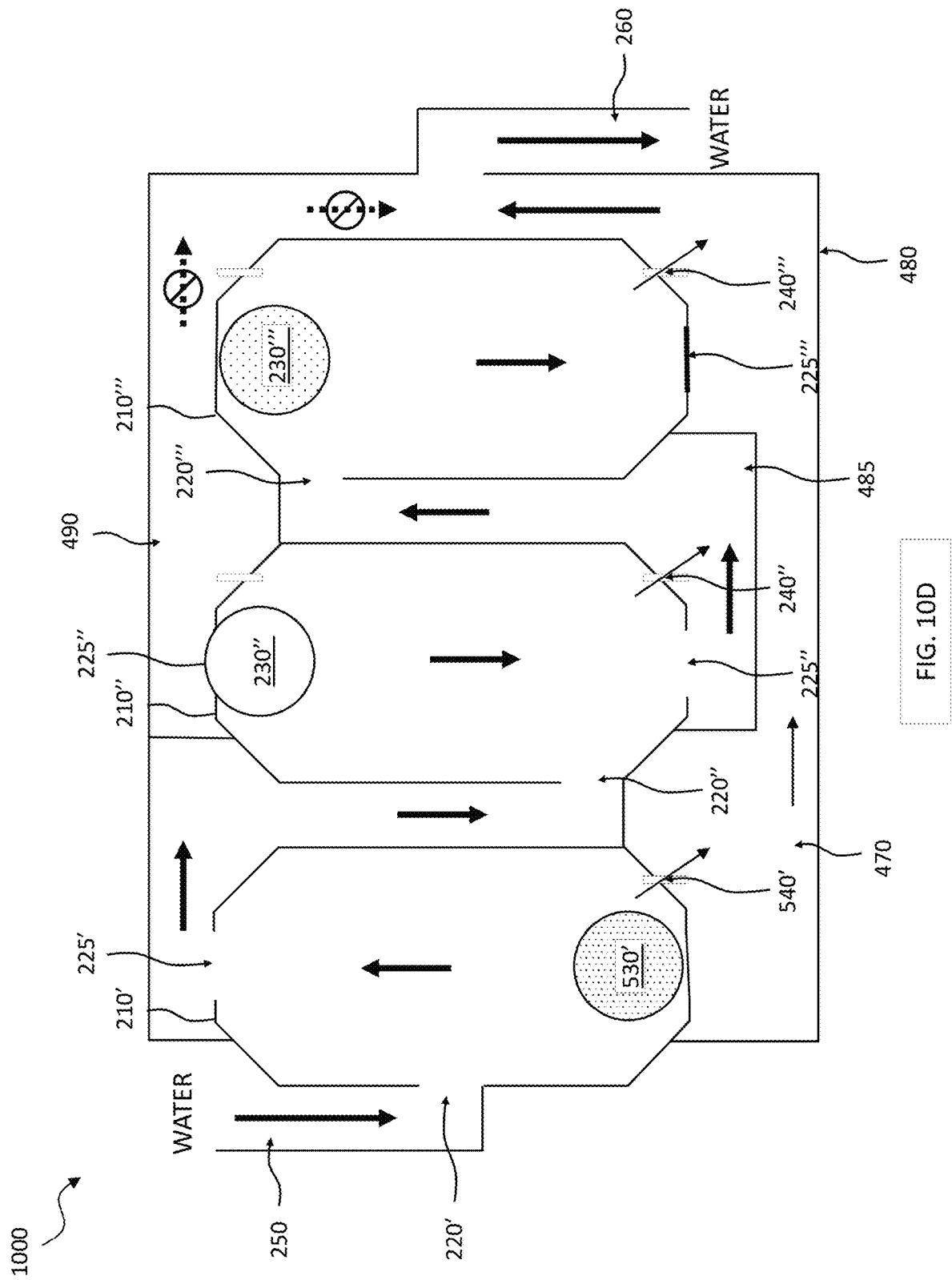

FIG. 9 illustrates a fluid flow control system 900 designed, manufactured and operated according to one or more embodiments of the disclosure. The fluid flow control system 900, in at least one embodiment, includes a flow regulator 915 operable to receive fluid 910 (e.g., production fluid from an annulus 905). The flow regulator 915, in at least the embodiment of FIG. 9, sends a first fluid flow portion 925 (e.g., first larger portion) of the fluid 910 to a valve 930, and sends a second fluid flow portion 955 (e.g., second smaller portion) of the fluid 910 to a density control valve 960.

The valve 930, which in some embodiments may be a piloted valve, may include a fluid inlet 935 operable to receive the first fluid flow portion 925, a control inlet 940 operable to receive control fluid 965 from an outlet conduit 964 of the density control valve 960, and a fluid outlet 945 operable to selectively pass the first fluid flow portion 925 to the tubing 970. The valve 930, in this embodiment, is thus configured to open or close the fluid outlet 945 based upon the control fluid 965 received from the outlet conduit 964 of the density control valve 960.

The density control valve 960 may be similar in form and function to any of the density control valves disclosed above, and thus receives the second fluid flow portion 955 via the inlet conduit 962, and selectively outputs the control fluid 965 to the valve 930 via the outlet conduit 964. In certain embodiments, the density control valve 960 is coupled with an orientation dependent inflow control apparatus, as disclosed in the text related to FIGS. 7 and 8 above. Furthermore, the density control valve 960 and the orientation dependent inflow control apparatus could be arranged as the density control valve system, as disclosed in the text related to FIG. 8 above. Accordingly, the density control valve system might not only be able to selectively send the control fluid 965 to the valve 930 based upon the type of fluid the fluid 910 embodies (e.g., mud, oil, gas, water), but may also account for any orientation issues of the density control valve 960.

The density control valve 960, in at least one embodiment consistent with the disclosure, includes one or more housings, one or more inlets and outlets to the housings, and an associated density dependent float contained within each of the housings. The density control valve 960 could operate, in at least one embodiment, similar to the operations discussed above with respect to FIGS. 5A through 5D. Thus, when the fluid 910 is mud based, the density control valve 960 would send a signal (e.g., the control fluid 965) to the valve 930, thereby allowing the valve 930 to pass the mud based fluid 910 from the annulus 905 to the tubing 970. Similarly, when the fluid 910 is oil based, the density control valve 960 would again send a signal (e.g., the control fluid 965) to the valve 930, thereby allowing the valve 930 to pass the oil based fluid 910 from the annulus 905 to the tubing 970. However, when the fluid 910 is water based or gas based, the density control valve 960 would refrain from sending a signal (e.g., the control fluid 965 to the valve 930, thereby allowing the valve 930 to preventing the water based or gas based fluid 910 from travelling from the annulus 905 to the tubing 970.

The above paragraph has been described such that the application of the control fluid 965 opens the valve 930, and the lack of application of the control fluid 965 closes the valve 930. In reality, the opposite could hold true. For example, a fluid flow control system 900 could exist such that the application of the control fluid 965 closes the valve 930, and the lack of application of the control fluid 965 opens the valve 930.

Turning briefly to FIGS. 10A through 10D, illustrated is an alternative embodiment of a density control valve 1000 at different stages of the well life of an oil producing well. The density control valve 1000 of FIGS. 10A through 10D is similar in many respects to the density control valve 400 of FIGS. 5A through 5D. Accordingly, like reference numbers have been used to indicate similar features. The density control valve 1000 differs, for the most part, from the density control valve 400, in that the density control valve 1000 does not pass mud or oil, but does pass gas and water. Accordingly, a density control valve 1000 could be used in the situation discussed in the paragraph directly above. The density control valve 1000 achieves the foregoing in at least one embodiment by removing the lower outlet 225' in the housing 210', adding an upper outlet 225" in the housing 210", and adding a lower outlet 225' and removing the upper outlet 225''' from the housing 210'. Doing so, as shown in FIGS. 10A through 10D, the density control valve 1000 operates in reverse of the density control valve 400.

Figure 11:
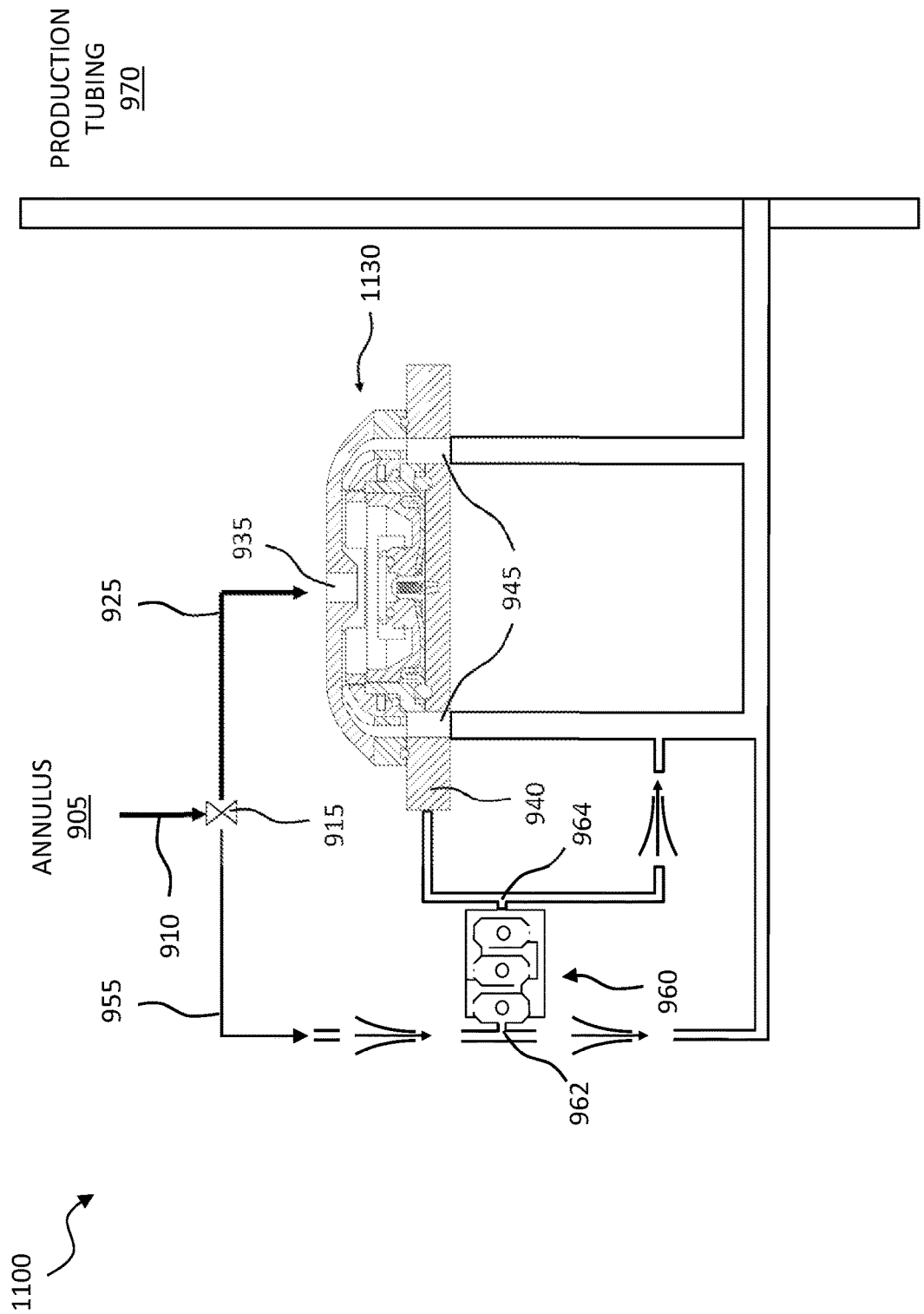
FIG. 11 illustrates a fluid flow control system designed, manufactured and operated according to one or more alternative embodiments of the disclosure.

FIG. 11 illustrates a fluid flow control system 1100 designed, manufactured and operated according to one or more alternative embodiments of the disclosure. The fluid flow control system 1100 is similar in many respects to the fluid flow control system 900. Accordingly, like reference numbers have been used to illustrate similar features. The fluid flow control system 1100, in contrast to the fluid flow control system 900, includes an alternative embodiment of an valve 1130. The valve 1130 still includes a fluid inlet 935 operable to receive the first fluid flow portion 925, a control inlet 940 operable to receive control fluid from an outlet conduit of the valve 960, and a fluid outlet 945. However, the valve 1130 is operable to pass the fluid 910 from the annulus 905 to the tubing 970 when no control fluid is received, and prevent the passing of the fluid 910 from the annulus 905 to the tubing 970 when a control fluid is received. Those skilled in the art understand that the density control valve 960 might need to be modified to accommodate the change in the valve 1130, including potentially changing certain ones of the inlets and outlets within the housings, as well as changing the density of the density dependent floats within each of the housings, for example to accommodate this change. Moreover, the density control valve 960 might need to be modified such that it does not discriminate between mud and oil, but treats mud and oil as one and the same. In at least one embodiment, such as shown, the density control valve 960 could be configured similar to the valve 1000 illustrated with regard to FIGS. 10A through 10D above.

Figure 12A:
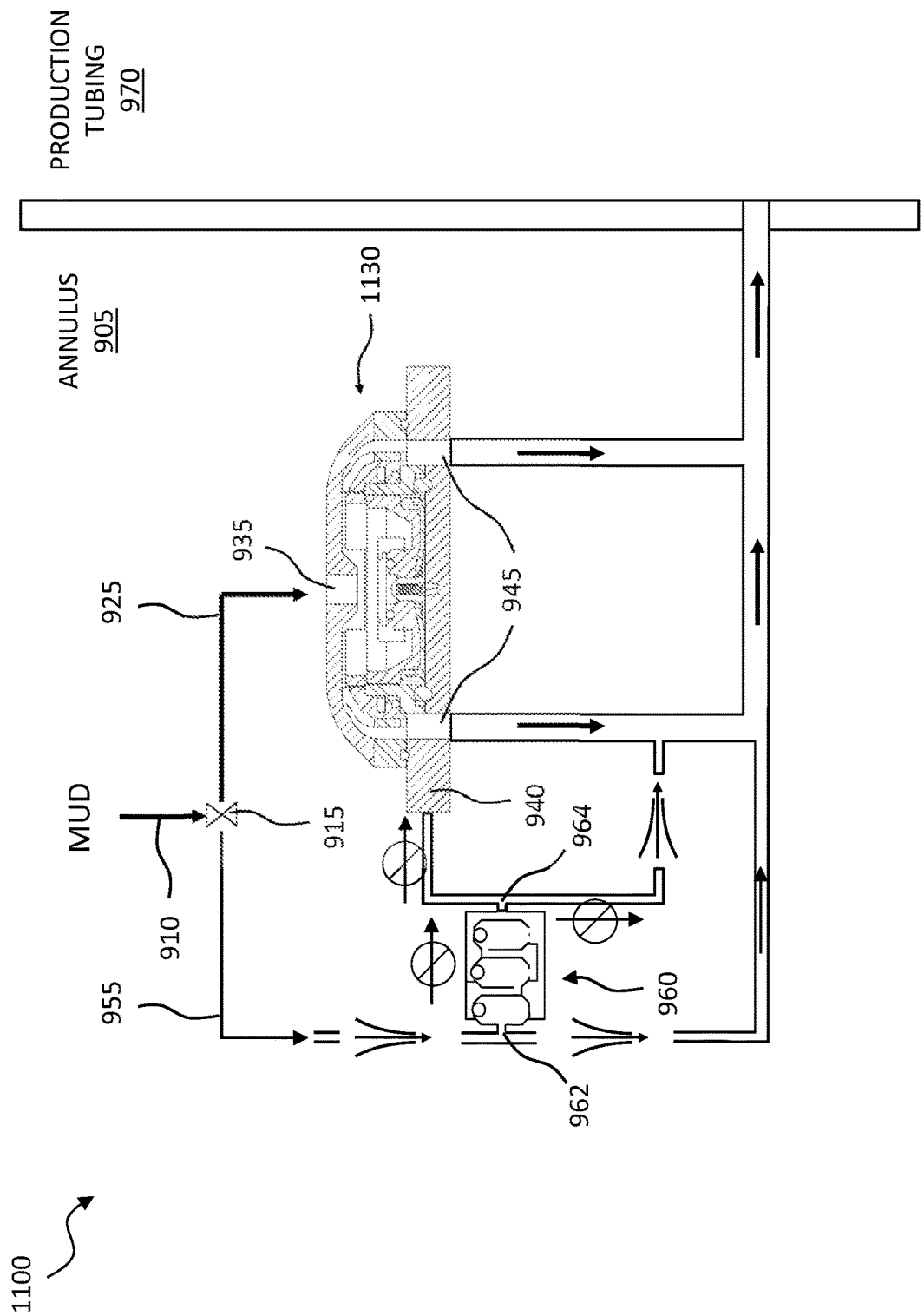
FIGS. 12A through 12D illustrate an alternative embodiment of a density control valve at different stages of the well life of an oil producing well.
Figure 12B:
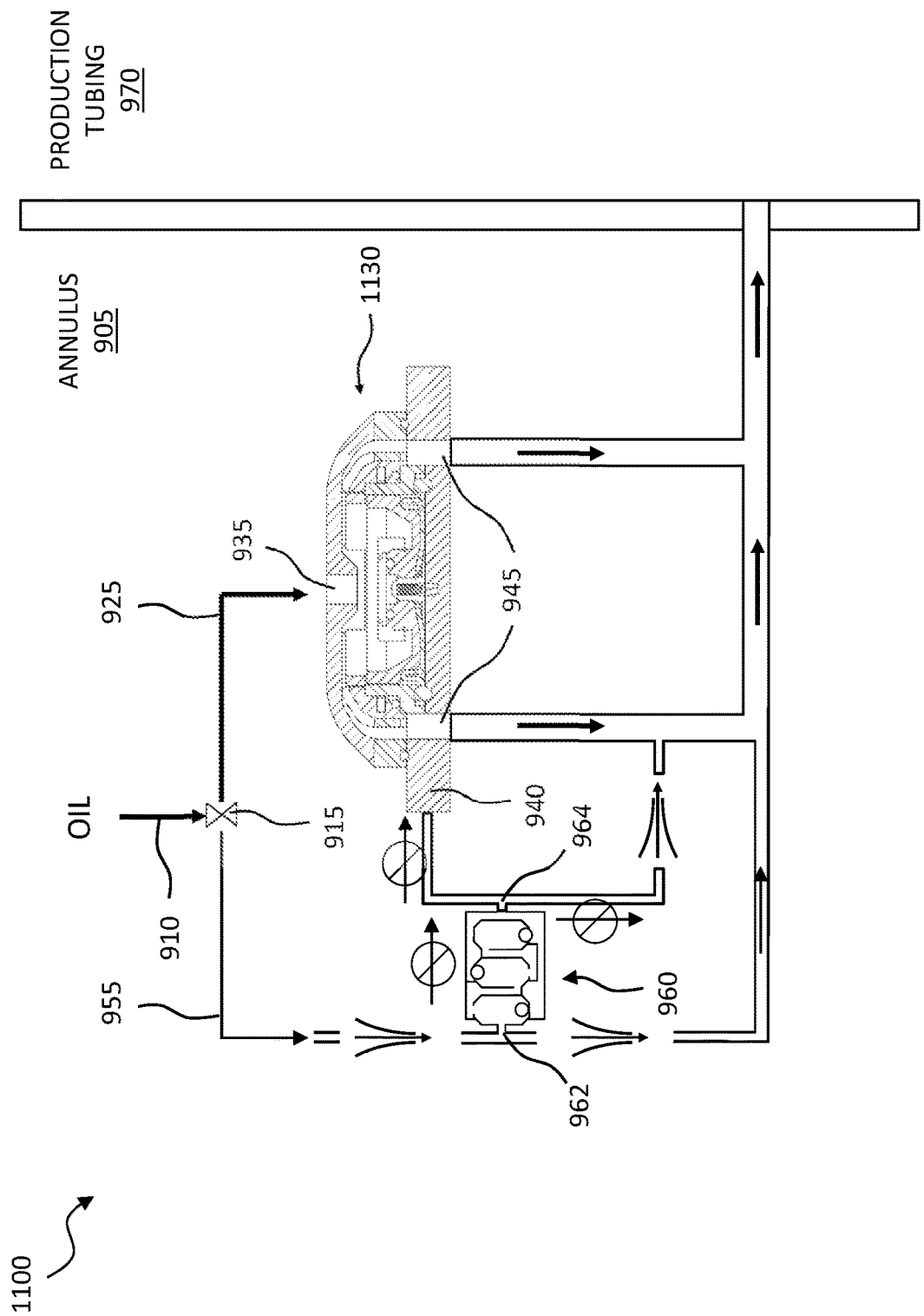
Figure 12C:
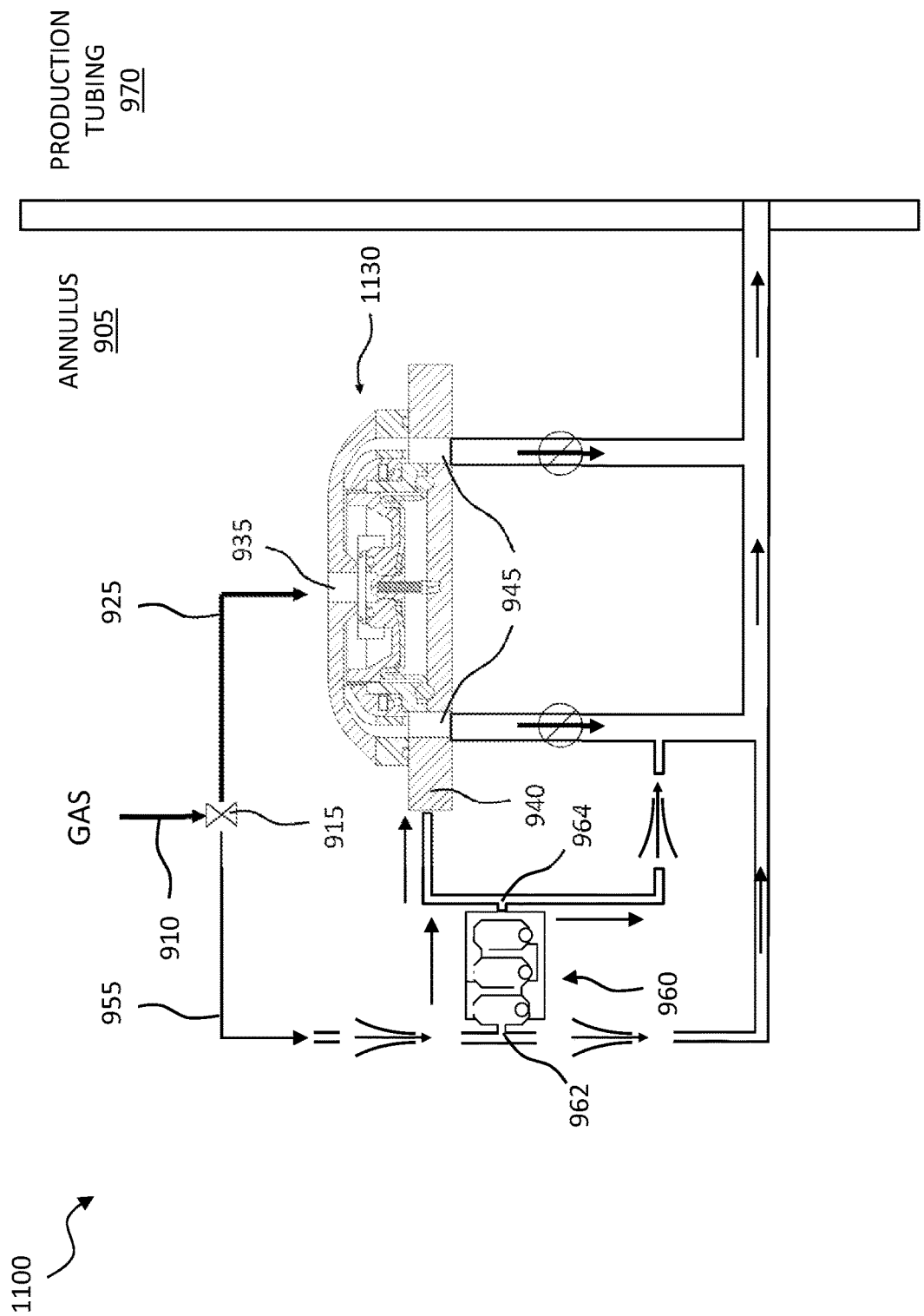
Figure 12D:
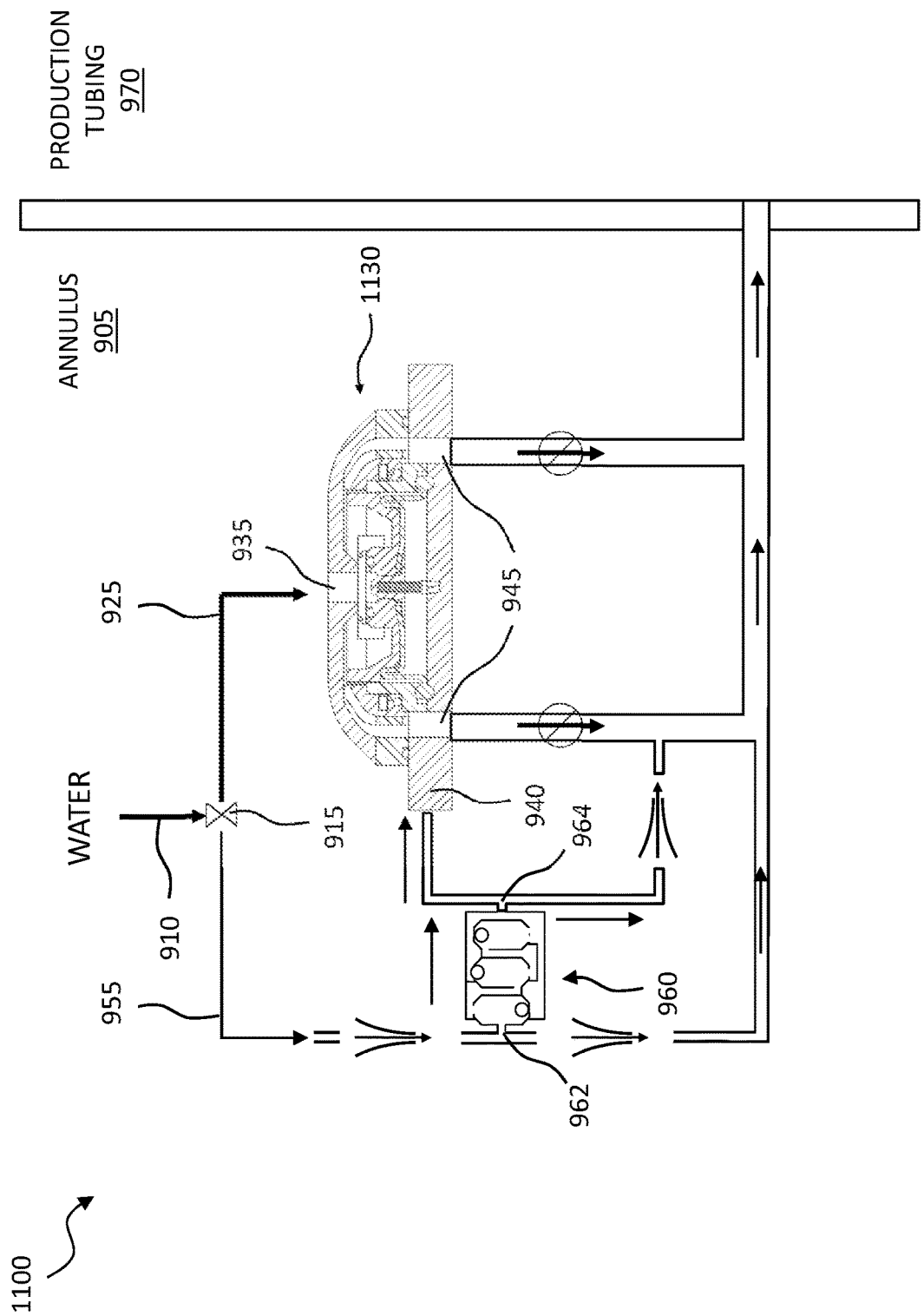

Turning to FIGS. 12A through 12D, illustrated is the fluid flow control system 1100 of FIG. 11 at different stages of the well life of an oil producing well. In FIG. 12A, mud will not flow through the density control valve 960 from the inlet conduit 962 to the outlet conduit 964, and thus will not close the valve 1130. In FIG. 12B, oil will again not flow through the density control valve 960 from the inlet conduit 962 to the outlet conduit 964, and thus will not close the valve 1130. In FIGS. 12C and 12D, gas and water respectively, will flow through the density control valve 960 from the inlet conduit 962 to the outlet conduit 964, and thus will close the valve 1130. The foregoing is achieved using the density control valve 960, which may or may not (e.g., depending on the design thereof) send a control signal to the valve 1130 to open or close.

Aspects disclosed herein include:

A. A fluid flow control system, the fluid flow control system including: 1) a valve having a fluid inlet operable to receive fluid, a control inlet operable to receive a control fluid, and a fluid outlet operable to pass the fluid to tubing, the valve configured to open or close the fluid outlet based upon the control fluid; and 2) a density control valve having an inlet conduit operable to receive the fluid and an outlet conduit coupled to the control inlet of the valve, the density control valve operable to send the control fluid to the valve to open or close the fluid outlet based upon a density of the fluid.

B. A well system, the well system including: 1) a wellbore; 2) tubing positioned within the wellbore, thereby forming an annulus with the wellbore; and 3) a fluid flow control system positioned at least partially within the annulus, the fluid flow control system including; a) a valve having a fluid inlet operable to receive fluid, a control inlet operable to receive a control fluid, and a fluid outlet operable to pass the fluid to the tubing, the valve configured to open or close the fluid outlet based upon the control fluid; and b) a density control valve having an inlet conduit operable to receive the fluid and an outlet conduit coupled to the control inlet of the valve, the density control valve operable to send the control fluid to the valve to open or close the fluid outlet based upon a density of the fluid.

Aspects A and B may have one or more of the following additional elements in combination: Element 1: wherein the density control valve includes a housing including an inlet and an outlet, as well as a density dependent float located within the housing, the density dependent float configured to expose or close the outlet based upon the density of the fluid therein. Element 2: wherein the housing is a first housing having a first inlet and a first outlet, and the density dependent float is a first density dependent float, and wherein the density control valve further includes a second housing including a second inlet and a second outlet. Element 3: wherein the first density dependent float has a density higher than that of gas, but lower than that of oil and water, and the second density dependent float has a density higher than that of gas and oil, but lower than that water. Element 4: wherein the housing is a first housing having a first inlet and a first outlet, and the density dependent float is a first density dependent float, and wherein the density control valve further includes a second housing including a second inlet and a second outlet, as well as a second density dependent float located within the second housing, and a third housing including a third inlet and a third outlet, as well as a third density dependent float located within the third housing. Element 5: wherein the first density dependent float has a density higher than that of oil, water and gas, but lower than that of drilling mud, the second density dependent float has a density higher than that of gas, but lower than that of mud, oil and water, and the third density dependent float has a density higher than that of gas and oil, but lower than that of mud and water. Element 6: wherein the first density dependent float is located between the inlet conduit and the second density dependent float, and the third density dependent float is located between the second density dependent float and the outlet conduit. Element 7: wherein the density dependent float has a cross-sectional area adjacent the outlet that is at least 200 percent larger than an area of the outlet. Element 8: wherein the density control valve forms at least a portion of a density control valve system, and wherein the density control valve system further includes an orientation dependent inflow control apparatus. Element 9: wherein the orientation dependent inflow control apparatus includes a first orientation housing having a first orientation inlet and outlet, and a first blocking member located within the first orientation housing, and a second orientation housing having a second orientation inlet and outlet, and a second blocking member located within the second orientation housing. Element 10: wherein the first orientation inlet is coupled to the fluid, the first orientation outlet is coupled to the second orientation inlet, and the second orientation outlet is coupled to the inlet conduit of the density control valve. Element 11: wherein the first blocking member and the second blocking member have a density higher than that of drilling mud, oil, gas and water. Element 12: wherein the density control valve includes a housing including an inlet and an outlet, as well as a density dependent float located within the housing, the density dependent float configured to expose or close the outlet based upon the density of the fluid therein. Element 13: wherein the housing is a first housing having a first inlet and a first outlet, and the density dependent float is a first density dependent float, and wherein the density control valve further includes a second housing including a second inlet and a second outlet. Element 14: wherein the first density dependent float has a density higher than that of gas, but lower than that of oil and water, and the second density dependent float has a density higher than that of gas and oil, but lower than that water. Element 15: wherein the housing is a first housing having a first inlet and a first outlet, and the density dependent float is a first density dependent float, and wherein the density control valve further includes a second housing including a second inlet and a second outlet, as well as a second density dependent float located within the second housing, and a third housing including a third inlet and a third outlet, as well as a third density dependent float located within the third housing. Element 16: wherein the first density dependent float has a density higher than that of oil, water and gas, but lower than that of drilling mud, the second density dependent float has a density higher than that of gas, but lower than that of mud, oil and water, and the third density dependent float has a density higher than that of gas and oil, but lower than that of mud and water. Element 17: wherein the first density dependent float is located between the inlet conduit and the second density dependent float, and the third density dependent float is located between the second density dependent float and the outlet conduit. Element 18: wherein the density dependent float has a cross-sectional area adjacent the outlet that is at least 200 percent larger than an area of the outlet. Element 19: wherein the density control valve forms at least a portion of a density control valve system, and wherein the density control valve system further includes an orientation dependent inflow control apparatus. Element 20: wherein the orientation dependent inflow control apparatus includes a first orientation housing having a first orientation inlet and outlet, and a first blocking member located within the first orientation housing, and a second orientation housing having a second orientation inlet and outlet, and a second blocking member located within the second orientation housing. Element 21: wherein the first orientation inlet is coupled to the fluid, the first orientation outlet is coupled to the second orientation inlet, and the second orientation outlet is coupled to the inlet conduit of the density control valve. Element 22: wherein the first blocking member and the second blocking member have a density higher than that of drilling mud, oil, gas and water.

Those skilled in the art to which this application relates will appreciate that other and further additions, deletions, substitutions and modifications may be made to the described embodiments.

What is claimed is:

1. A fluid flow control system, comprising:
   a fluid flow control valve having a fluid inlet operable to receive fluid, a control inlet operable to receive a control fluid, and a fluid outlet operable to pass the fluid to tubing, the fluid flow control valve having a member that is configured to move from a closed state to an open state to open the fluid outlet based upon the control fluid and move from the open state to the closed state to close the fluid outlet based upon the control fluid; and
   a density control valve having an inlet conduit operable to receive the fluid and an outlet conduit coupled to the control inlet of the fluid flow control valve, the density control valve operable to send the control fluid to the control inlet of the fluid flow control valve to open or close the fluid outlet based upon a density of the fluid, wherein the member of the fluid flow control valve is configured such that when it moves between the closed state and the open state it does not prevent the fluid from travelling between the inlet and outlet of the density control valve.

2. The fluid flow control system as recited in claim 1, wherein the density control valve includes a housing including an inlet and an outlet, as well as a density dependent float located within the housing, the density dependent float configured to expose or close the outlet based upon the density of the fluid therein.

3. The fluid flow control system as recited in claim 2, wherein the housing is a first housing having a first inlet and a first outlet, and the density dependent float is a first density dependent float, and wherein the density control valve further includes a second housing including a second inlet and a second outlet.

4. The fluid flow control system as recited in claim 3, wherein the first density dependent float has a density higher than that of gas, but lower than that of oil and water, and the second density dependent float has a density higher than that of gas and oil, but lower than that water.

5. The fluid flow control system as recited in claim 2, wherein the housing is a first housing having a first inlet and a first outlet, and the density dependent float is a first density dependent float, and wherein the density control valve further includes a second housing including a second inlet and a second outlet, as well as a second density dependent float located within the second housing, and a third housing including a third inlet and a third outlet, as well as a third density dependent float located within the third housing.

6. The fluid flow control system as recited in claim 5, wherein the first density dependent float has a density higher than that of oil, water and gas, but lower than that of drilling mud, the second density dependent float has a density higher than that of gas, but lower than that of mud, oil and water, and the third density dependent float has a density higher than that of gas and oil, but lower than that of mud and water.

7. The fluid flow control system as recited in claim 6, wherein the first density dependent float is located between the inlet conduit and the second density dependent float, and the third density dependent float is located between the second density dependent float and the outlet conduit.

8. The fluid flow control system as recited in claim 2, wherein the density dependent float has a cross-sectional area adjacent the outlet that is at least 200 percent larger than an area of the outlet.

9. The fluid flow control system as recited in claim 1, wherein the density control valve forms at least a portion of a density control valve system, and wherein the density control valve system further includes an orientation dependent inflow control apparatus.

10. The fluid flow control system as recited in claim 9, wherein the orientation dependent inflow control apparatus includes a first orientation housing having a first orientation inlet and outlet, and a first blocking member located within the first orientation housing, and a second orientation housing having a second orientation inlet and outlet, and a second blocking member located within the second orientation housing.

11. The fluid flow control system as recited in claim 10, wherein the first orientation inlet is coupled to the fluid, the first orientation outlet is coupled to the second orientation inlet, and the second orientation outlet is coupled to the inlet conduit of the density control valve.

12. The fluid flow control system as recited in claim 11, wherein the first blocking member and the second blocking member have a density higher than that of drilling mud, oil, gas and water.

13. A well system, comprising:
a wellbore;
tubing positioned within the wellbore, thereby forming an annulus with the wellbore; and
a fluid flow control system positioned at least partially within the annulus, the fluid flow control system including;
a fluid flow control valve having a fluid inlet operable to receive fluid, a control inlet operable to receive a control fluid, and a fluid outlet operable to pass the fluid to the tubing, the fluid flow control valve having a non-soluble member that is configured to move from a closed state to an open state to open the fluid outlet based upon the control fluid and move from the open state to the closed state to close the fluid outlet based upon the control fluid; and
a density control valve having an inlet conduit operable to receive the fluid and an outlet conduit coupled to the control inlet of the fluid flow control valve, the density control valve operable to send the control fluid to the control inlet of the fluid flow control valve to open or close the fluid outlet based upon a density of the fluid, wherein the member of the fluid flow control valve is configured such that when it moves between the closed state and the open state it does not prevent the fluid from travelling between the inlet and outlet of the density control valve.

14. The well system as recited in claim 13, wherein the density control valve includes a housing including an inlet and an outlet, as well as a density dependent float located within the housing, the density dependent float configured to expose or close the outlet based upon the density of the fluid therein.

15. The well system as recited in claim 14, wherein the housing is a first housing having a first inlet and a first outlet, and the density dependent float is a first density dependent float, and wherein the density control valve further includes a second housing including a second inlet and a second outlet.

16. The well system as recited in claim 15, wherein the first density dependent float has a density higher than that of gas, but lower than that of oil and water, and the second density dependent float has a density higher than that of gas and oil, but lower than that water.

17. The well system as recited in claim 14, wherein the housing is a first housing having a first inlet and a first outlet, and the density dependent float is a first density dependent float, and wherein the density control valve further includes a second housing including a second inlet and a second outlet, as well as a second density dependent float located within the second housing, and a third housing including a third inlet and a third outlet, as well as a third density dependent float located within the third housing.

18. The well system as recited in claim 17, wherein the first density dependent float has a density higher than that of oil, water and gas, but lower than that of drilling mud, the second density dependent float has a density higher than that of gas, but lower than that of mud, oil and water, and the third density dependent float has a density higher than that of gas and oil, but lower than that of mud and water.

19. The well system as recited in claim 18, wherein the first density dependent float is located between the inlet conduit and the second density dependent float, and the third density dependent float is located between the second density dependent float and the outlet conduit.

20. The well system as recited in claim 14, wherein the density dependent float has a cross-sectional area adjacent the outlet that is at least 200 percent larger than an area of the outlet.

21. The well system as recited in claim 13, wherein the density control valve forms at least a portion of a density control valve system, and wherein the density control valve system further includes an orientation dependent inflow control apparatus.

22. The well system as recited in claim 21, wherein the orientation dependent inflow control apparatus includes a first orientation housing having a first orientation inlet and outlet, and a first blocking member located within the first orientation housing, and a second orientation housing having a second orientation inlet and outlet, and a second blocking member located within the second orientation housing.

23. The well system as recited in claim 22, wherein the first orientation inlet is coupled to the fluid, the first orientation outlet is coupled to the second orientation inlet, and the second orientation outlet is coupled to the inlet conduit of the density control valve.

24. The well system as recited in claim 23, wherein the first blocking member and the second blocking member have a density higher than that of drilling mud, oil, gas and water.

* * * * *

UNITED STATES PATENT AND TRADEMARK OFFICE
CERTIFICATE OF CORRECTION

PATENT NO. : 12,378,850 B2  
APPLICATION NO. : 17/237257  
DATED : August 5, 2025  
INVENTOR(S) : Michael Linley Fripp, Stephen Michael Greci and Ibrahim El Mallawany Page 1 of 1

It is certified that error appears in the above-identified patent and that said Letters Patent is hereby corrected as shown below:

In the Claims

In Claim 13, Column 16, Line 16, after --a-- delete "non-soluble"

Signed and Sealed this  
Twenty-eighth Day of October, 2025

John A. Squires  
*Director of the United States Patent and Trademark Office*